US009992520B2

(12) United States Patent
Williamson et al.

(10) Patent No.: US 9,992,520 B2
(45) Date of Patent: Jun. 5, 2018

(54) APPARATUS AND METHODS FOR PROVIDING CONTENT TO AN IP-ENABLED DEVICE IN A CONTENT DISTRIBUTION NETWORK

(71) Applicant: Time Warner Cable Enterprises LLC, New York, NY (US)

(72) Inventors: Louis D. Williamson, Denver, CO (US); William L. Helms, Longmont, CO (US); Howard Pfeffer, Reston, VA (US); Noah Paci, Westminster, CO (US); Tushar Nakhre, Herndon, VA (US); Andrew Danforth, Chantilly, VA (US); Charles Hasek, Broomfield, CO (US); Shan Huang, Ashburn, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days. days.

(21) Appl. No.: 14/954,754

(22) Filed: Nov. 30, 2015

(65) Prior Publication Data
US 2016/0165268 A1    Jun. 9, 2016

Related U.S. Application Data

(63) Continuation of application No. 13/403,802, filed on Feb. 23, 2012, now abandoned.

(51) Int. Cl.
*H04N 21/235* (2011.01)
*H04L 9/08* (2006.01)
(Continued)

(52) U.S. Cl.
CPC ......... *H04N 21/2351* (2013.01); *G06F 21/10* (2013.01); *H04L 9/0825* (2013.01);
(Continued)

(58) Field of Classification Search
CPC ............ G06F 2221/0786; G06F 21/10; H04L 63/0428; H04L 63/145
(Continued)

(56) References Cited

U.S. PATENT DOCUMENTS

| 6,016,316 A | 1/2000 | Moura et al. |
|---|---|---|
| 6,769,127 B1 | 7/2004 | Bonomi et al. |

(Continued)

FOREIGN PATENT DOCUMENTS

| WO | WO-2010008487 A1 | 1/2010 |
|---|---|---|
| WO | WO-2011035443 A1 | 3/2011 |
| WO | WO-2011053858 A1 | 5/2011 |

OTHER PUBLICATIONS

American national Standard. ANSI/SCTE 35 2012. Digital Program Insertion Cueing Message for Cable, by Society of Cable Telecommunication Engineers, 2012.
(Continued)

*Primary Examiner* — Hadi S Armouche
*Assistant Examiner* — Hee K Song
(74) *Attorney, Agent, or Firm* — Gazdzinski & Associates, PC

(57) ABSTRACT

Apparatus and methods for providing content to IP-enabled devices in a content distribution network. In one embodiment, a network architecture is disclosed which enables delivery of content to such IP-enabled devices without the use of a high-speed data connection This capability allow the managed network operator to provide content services to an IP-enabled device associated with a non-data subscriber. In one implementation, requests for content from user IP-enabled devices are received, authenticated, and content processed into a series of encrypted segments. Once the requesting user/device is authenticated, the segments are provided with a playlist. The rendering device is also (Continued)

provided access to a decryption key (e.g., via a URL to a managed key server). Variants providing (i) user access to the MSO distribution network via an indigenous modem or gateway; and (ii) user access to the MSO core via a gateway and a third party unmanaged network are described.

17 Claims, 12 Drawing Sheets

(51) Int. Cl.

| | |
|---|---|
| H04L 9/14 | (2006.01) |
| H04N 21/258 | (2011.01) |
| H04N 21/262 | (2011.01) |
| H04N 21/266 | (2011.01) |
| H04N 21/4405 | (2011.01) |
| H04N 21/643 | (2011.01) |
| H04N 21/845 | (2011.01) |
| G06F 21/10 | (2013.01) |
| H04L 9/32 | (2006.01) |
| H04L 29/08 | (2006.01) |
| H04N 21/236 | (2011.01) |

(52) U.S. Cl.
CPC .................. *H04L 9/14* (2013.01); *H04L 9/32* (2013.01); *H04L 67/02* (2013.01); *H04N 21/236* (2013.01); *H04N 21/25816* (2013.01); *H04N 21/26258* (2013.01); *H04N 21/26613* (2013.01); *H04N 21/4405* (2013.01); *H04N 21/64322* (2013.01); *H04N 21/8456* (2013.01); *G06F 2221/0706* (2013.01); *G06F 2221/0784* (2013.01); *H04L 2209/603* (2013.01)

(58) Field of Classification Search
USPC .. 725/2, 25, 61, 87, 93, 106, 114, 145, 151; 726/1, 13, 12; 709/217, 221, 222, 227, 709/231; 713/151, 155, 164, 168
See application file for complete search history.

(56) References Cited

U.S. PATENT DOCUMENTS

| | | | |
|---|---|---|---|
| 6,917,614 B1 | 7/2005 | Laubach et al. | |
| 6,917,641 B2 | 7/2005 | Kotzin et al. | |
| 7,174,126 B2 | 2/2007 | McElhatten et al. | |
| 7,457,520 B2 | 11/2008 | Rosetti et al. | |
| 7,592,912 B2 | 9/2009 | Hasek et al. | |
| 7,602,820 B2 | 10/2009 | Helms et al. | |
| 7,763,360 B2 | 7/2010 | Paul et al. | |
| 7,954,131 B2 | 5/2011 | Cholas et al. | |
| 8,024,762 B2 | 9/2011 | Britt | |
| 8,073,460 B1 | 12/2011 | Scofield et al. | |
| 8,078,696 B2 | 12/2011 | Lajoie et al. | |
| 8,090,014 B2 | 1/2012 | Cheung et al. | |
| 8,090,104 B2* | 1/2012 | Wajs | H04N 21/2265 380/239 |
| 8,095,610 B2 | 1/2012 | Gould et al. | |
| 8,099,757 B2 | 1/2012 | Riedl et al. | |
| 8,151,294 B2 | 4/2012 | Carlucci et al. | |
| 8,181,209 B2 | 5/2012 | Hasek et al. | |
| 8,214,256 B2 | 7/2012 | Riedl et al. | |
| 8,280,982 B2 | 10/2012 | La et al. | |
| 8,341,242 B2 | 12/2012 | Dillon et al. | |
| 8,396,055 B2 | 3/2013 | Patel et al. | |
| 8,472,371 B1 | 6/2013 | Bari et al. | |
| 8,516,529 B2 | 8/2013 | Lajoie et al. | |
| 8,561,116 B2 | 10/2013 | Hasek | |
| 8,838,149 B2 | 9/2014 | Hasek | |
| 9,021,566 B1 | 4/2015 | Panayotopoulos et al. | |
| 2003/0056217 A1 | 3/2003 | Brooks | |
| 2003/0086422 A1 | 5/2003 | Klinker et al. | |
| 2003/0123465 A1 | 7/2003 | Donahue | |
| 2004/0083177 A1 | 4/2004 | Chen et al. | |
| 2005/0002638 A1 | 1/2005 | Putterman et al. | |
| 2005/0028208 A1 | 2/2005 | Ellis et al. | |
| 2005/0034171 A1 | 2/2005 | Benya | |
| 2006/0059532 A1 | 3/2006 | Dugan et al. | |
| 2006/0128397 A1 | 6/2006 | Choti et al. | |
| 2006/0139379 A1 | 6/2006 | Toma et al. | |
| 2006/0165082 A1 | 7/2006 | Pfeffer et al. | |
| 2007/0014293 A1 | 1/2007 | Filsfils et al. | |
| 2007/0022459 A1 | 1/2007 | Gaebel, Jr. et al. | |
| 2007/0033531 A1 | 2/2007 | Marsh | |
| 2007/0094691 A1 | 4/2007 | Gazdzinski | |
| 2007/0136777 A1 | 6/2007 | Hasek et al. | |
| 2007/0157228 A1 | 7/2007 | Bayer et al. | |
| 2007/0204308 A1 | 8/2007 | Nicholas et al. | |
| 2007/0217436 A1 | 9/2007 | Markley et al. | |
| 2007/0276925 A1 | 11/2007 | La et al. | |
| 2008/0027801 A1 | 1/2008 | Walter et al. | |
| 2008/0066095 A1 | 3/2008 | Reinoso | |
| 2008/0092058 A1 | 4/2008 | Afergan et al. | |
| 2008/0109853 A1 | 5/2008 | Einarsson et al. | |
| 2008/0168487 A1 | 7/2008 | Chow et al. | |
| 2008/0184344 A1 | 7/2008 | Hernacki et al. | |
| 2008/0189617 A1 | 8/2008 | Covell et al. | |
| 2008/0200154 A1 | 8/2008 | Maharajh et al. | |
| 2008/0201736 A1 | 8/2008 | Gordon et al. | |
| 2008/0215755 A1 | 9/2008 | Farber et al. | |
| 2008/0235746 A1 | 9/2008 | Peters et al. | |
| 2008/0256615 A1 | 10/2008 | Schlacht et al. | |
| 2009/0006211 A1 | 1/2009 | Perry et al. | |
| 2009/0076898 A1 | 3/2009 | Wang et al. | |
| 2009/0077583 A1 | 3/2009 | Sugiyama et al. | |
| 2009/0083279 A1 | 3/2009 | Hasek | |
| 2009/0094347 A1 | 4/2009 | Ting et al. | |
| 2009/0119703 A1 | 5/2009 | Piepenbrink et al. | |
| 2009/0187939 A1 | 7/2009 | Lajoie | |
| 2009/0210899 A1 | 8/2009 | Lawrence-Apfelbaum et al. | |
| 2009/0228941 A1 | 9/2009 | Russell et al. | |
| 2009/0248794 A1 | 10/2009 | Helms | |
| 2010/0027787 A1 | 2/2010 | Benkert et al. | |
| 2010/0036720 A1 | 2/2010 | Jain et al. | |
| 2010/0115540 A1 | 5/2010 | Fan et al. | |
| 2010/0121936 A1* | 5/2010 | Liu | H04N 5/44543 709/217 |
| 2010/0131973 A1 | 5/2010 | Dillon et al. | |
| 2010/0132003 A1 | 5/2010 | Bennett et al. | |
| 2010/0162367 A1 | 6/2010 | Lajoie et al. | |
| 2010/0169503 A1 | 7/2010 | Kollmansberger et al. | |
| 2010/0186029 A1 | 7/2010 | Kim et al. | |
| 2010/0251304 A1 | 9/2010 | Donoghue et al. | |
| 2010/0262461 A1 | 10/2010 | Bohannon | |
| 2010/0262999 A1 | 10/2010 | Curran | |
| 2010/0313225 A1 | 12/2010 | Cholas et al. | |
| 2010/0333137 A1 | 12/2010 | Hamano et al. | |
| 2011/0015989 A1 | 1/2011 | Tidwell et al. | |
| 2011/0016479 A1 | 1/2011 | Tidwell et al. | |
| 2011/0055866 A1 | 3/2011 | Piepenbrink et al. | |
| 2011/0058675 A1* | 3/2011 | Brueck | H04N 21/2541 380/277 |
| 2011/0083069 A1 | 4/2011 | Paul et al. | |
| 2011/0083144 A1 | 4/2011 | Bocharov et al. | |
| 2011/0093900 A1 | 4/2011 | Patel et al. | |
| 2011/0103374 A1 | 5/2011 | Lajoie et al. | |
| 2011/0107364 A1 | 5/2011 | Lajoie et al. | |
| 2011/0107379 A1 | 5/2011 | Lajoie et al. | |
| 2011/0138064 A1 | 6/2011 | Rieger et al. | |
| 2011/0154383 A1 | 6/2011 | Hao et al. | |
| 2011/0223944 A1 | 9/2011 | Gosselin | |
| 2011/0231660 A1* | 9/2011 | Kanungo | H04L 63/0435 713/168 |
| 2011/0246616 A1* | 10/2011 | Ronca | H04N 21/26258 709/219 |
| 2011/0258049 A1 | 10/2011 | Ramer et al. | |
| 2011/0264530 A1 | 10/2011 | Santangelo et al. | |
| 2011/0265116 A1 | 10/2011 | Stern et al. | |
| 2011/0302624 A1* | 12/2011 | Chen | G06Q 20/10 726/1 |
| 2012/0008786 A1 | 1/2012 | Cronk et al. | |

(56) References Cited

U.S. PATENT DOCUMENTS

| | | |
|---|---|---|
| 2012/0072526 A1* | 3/2012 | Kling ................... H04L 67/06 709/213 |
| 2012/0076015 A1 | 3/2012 | Pfeffer |
| 2012/0079523 A1 | 3/2012 | Trimper et al. |
| 2012/0089699 A1 | 4/2012 | Cholas |
| 2012/0096106 A1* | 4/2012 | Blumofe ................ G06Q 50/00 709/213 |
| 2012/0124612 A1* | 5/2012 | Adimatyam ..... H04N 21/25841 725/27 |
| 2012/0137332 A1 | 5/2012 | Kumar |
| 2012/0144195 A1* | 6/2012 | Nair .................... H04L 63/0428 713/168 |
| 2012/0151077 A1* | 6/2012 | Finster .................... G06F 21/10 709/231 |
| 2012/0167132 A1 | 6/2012 | Mathews et al. |
| 2012/0170544 A1 | 7/2012 | Cheng et al. |
| 2012/0170741 A1* | 7/2012 | Chen .................. H04L 63/0428 380/210 |
| 2012/0173746 A1* | 7/2012 | Salinger ............. H04L 41/5019 709/230 |
| 2012/0185693 A1 | 7/2012 | Chen et al. |
| 2012/0246462 A1* | 9/2012 | Moroney ................ H04L 63/10 713/151 |
| 2012/0278833 A1* | 11/2012 | Tam ................... H04N 21/2343 725/31 |
| 2012/0284804 A1* | 11/2012 | Lindquist ............ H04L 63/0428 726/29 |
| 2012/0308071 A1* | 12/2012 | Ramsdell ........... H04N 1/32144 382/100 |
| 2012/0324552 A1* | 12/2012 | Padala ................. H04L 9/3213 726/6 |
| 2013/0031578 A1* | 1/2013 | Zhu ................. H04N 21/23109 725/32 |
| 2013/0046849 A1* | 2/2013 | Wolf ................... H04L 67/2842 709/217 |
| 2013/0132986 A1 | 5/2013 | Mack et al. |
| 2013/0133010 A1 | 5/2013 | Chen |
| 2013/0166906 A1 | 6/2013 | Swaminathan et al. |
| 2013/0174271 A1* | 7/2013 | Handal ............. G06F 17/30017 726/27 |
| 2013/0179588 A1 | 7/2013 | McCarthy et al. |
| 2013/0219178 A1* | 8/2013 | Xiques ................... H04L 9/083 713/168 |
| 2013/0227283 A1 | 8/2013 | Williamson et al. |
| 2013/0227284 A1 | 8/2013 | Pfeffer et al. |
| 2014/0012843 A1 | 1/2014 | Soon-Shiong |
| 2014/0245341 A1 | 8/2014 | Mack et al. |
| 2014/0259182 A1 | 9/2014 | Mershon |
| 2015/0109122 A1 | 4/2015 | Stern et al. |
| 2015/0163540 A1 | 6/2015 | Masterson |
| 2016/0241617 A1* | 8/2016 | Jelley ............... G06F 17/30017 |

OTHER PUBLICATIONS

Apple Inc, The apparatus and methods of H1TP Live Streaming Overview', Apr. 1, 2011.

Open Cable Specifications Alternate Content Real-Time Event Signaling and Management API by Cable Television Laboratories. Inc. 2012.

SCTE Standards Document ANSUSCTE 118-2 2007 entitled Program-Specific Ad Insertion—Content Provider to Traffic Communication Applications Data Model.

SCTE Standards Document ANSUSCTE 130-1 2008 entitled Digital Progra section Advertising Systems Interfaces.

Zambell "The Apparatus and Methods of HS Smooth Streaming Technical Overview,'" Mar. 2009.

* cited by examiner

APPARATUS AND METHODS FOR PROVIDING CONTENT TO AN IP-ENABLED DEVICE IN A CONTENT DISTRIBUTION NETWORK

PRIORITY AND RELATED APPLICATIONS

The present application is a continuation of U.S. patent application Ser. No. 13/403,802 filed Feb. 23, 2012 and entitled "APPARATUS AND METHODS FOR PROVIDING CONTENT TO AN IP-ENABLED DEVICE IN A CONTENT DISTRIBUTION NETWORK", and is related to co-owned, co-pending U.S. patent application Ser. No. 13/403,814 filed on Feb. 23, 2012 and entitled "APPARATUS AND METHODS FOR CONTENT DISTRIBUTION TO PACKET-ENABLED DEVICES VIA A NETWORK BRIDGE", each of the foregoing which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of data and content distribution and delivery. In one exemplary aspect, the invention relates to the delivery of content to an IP-enabled device via a content distribution network.

2. Description of Related Technology

Content distribution networks (such as e.g., Cable Television (CATV), satellite, or hybrid fiber/copper (HFCu) systems) provide content from various content sources at a network headend to a plurality of subscriber devices. In a typical "managed" network, a network operator (e.g., multiple systems operator or MSO) provides access to content via the network. Generally, the MSO provides audio/video content to subscribers via the network headend.

Recent advances in digital information processing and technology have made a whole range of services and functions available for delivery to consumers at various types of devices for very reasonable prices or subscription fees. These services and functions include delivery of digital content or programming (movies, etc.), digital video-on-demand (VOD) services, personal video recorder (PVR) and networked PVR (nPVR) services, Internet Protocol television (IPTV), digital media playback and recording, as well high speed Internet access (including so-called "Internet TV", where television programming is delivered over the Internet) and IP-based telephony (e.g., VoIP). Other services available to network users include without limitation access to, and recording of, digital music (e.g., MP3 files), and submission of "organic" media (e.g., home-grown Youtube videos, etc.).

Currently, many of these services are provided to users via a wide variety of different equipment environments and delivery paradigms including, inter alia, cable or satellite modems or QAMs, HFCu (i.e., Hybrid Fiber-copper distribution via indigenous POST/PSTN and/or coaxial wiring in a premises), optical fiber such as FTTC, FTTH, etc., Wi-Fi™ hubs, Ethernet hubs, gateways, switches, and routers, and to a plurality of user equipment types (e.g., set-top boxes, personal (desktop) computers, laptop computers, other mini-computers such as so-called "netbooks" and mini-notebook computers, and/or other devices). Recent advances in consumer electronics have also led to the widespread introduction of a variety of portable media devices (PMDs) such as, inter alia, portable digital music devices such as the well known Apple iPod™ and iPad™, and other so-called "MP3 players", cellular telephones/smartphones, handheld computers, tablets such as the Kindle™ and Nook™ and iPad™, and personal digital assistants (PDA), which allow users to store and playback audio and video files.

Although a myriad of services, equipment, data formats and providers are available, current systems offer no suitable mechanism for efficiently providing content to IP-enabled devices via a managed network without utilizing a traditional IP content delivery system (i.e., a high speed data connection, such as a cable modem termination system or CMTS). As noted previously, network operators may be capable of providing audio/video data over their own managed IP content delivery networks; however, such mechanisms are only accessible to subscribers of the network via a high-speed data connection. For example, "basic cable" CATV subscribers (which often form the backbone of revenue streams for a managed network operator), do not under existing technology have access to MSO-provided content via an IP-enabled device such as a PC, smartphone, or tablet computer.

Hence, methods and apparatus are needed which enable flexible delivery of content to IP-enabled devices without the use of a high-speed data connection; i.e., via another distribution platform (such as for example a traditional CATV or other distribution network). Ideally, the methods and apparatus would be able to allow the network operator to provide audio/video content services to an IP-enabled device associated with a non-data subscriber of the operator's network. For example, an MSO would be able to make content delivery services available to a subscriber's tablet computer (e.g., iPad) when the owner thereof does not subscribe to the MSO's high-speed data network or services, and instead only subscribes to the MSO's video services. Such methods and apparatus would advantageously enable a user to receive content on IP-enabled devices, which are generally more mobile than non-IP devices, thereby enhancing the user experience by no longer anchoring the user to a fixed location.

Furthermore, the ideal solution would take advantage of extant network structure and function to the maximum extent practicable in order to minimize MSO investment/latency in providing such services.

SUMMARY OF THE INVENTION

The present invention provides, inter alia, apparatus and methods for packet (e.g., IP) content distribution to packet-enabled devices.

In a first aspect of the invention, a method for providing content to an IP-enabled consumer device is disclosed. In one embodiment, the method includes: receiving a request for a content element; processing the content element into a plurality of segments; cryptographically protecting at least a portion of the plurality of segments; generating a playlist for playback of the plurality of segments; and providing the playlist and the plurality of protected segments to the consumer device via a content distribution network.

In one variant, the content distribution network includes a managed network having a plurality of subscribers, and the consumer device includes a device associated with at least one of the subscribers. The managed network includes for example: (i) a cable television network; (ii) a satellite network; or (iii) a hybrid fiber copper (HFCu) network.

In another variant, the request is received directly or indirectly from the consumer device, and the method further includes authenticating the consumer device, and optionally evaluating an entitlement for a user associated with the user device to access the requested content (and/or an entitlement for the user device to access the requested content).

In a further variant, the method further includes: generating a cryptographic element in response to the received request; and transmitting at least a portion of the cryptographic element to the consumer device, the transmitted at least portion enabling the consumer device to the plurality of protected segments.

The cryptographic protection includes in one implementation the encryption of the plurality of segments utilizing a symmetric encryption key approach.

In another variant, the plurality of segments includes a plurality of MPEG transport stream (.ts) files.

In a further variant, at least the plurality of protected segments and the playlist are provided as part of a common data structure to the consumer device. The common data structure further includes in some cases a cryptographic key enabling the consumer device to access the plurality of protected segments, or the key may be provided separate from the common structure; e.g., via a URL provided to the consumer device, the cryptographic key enabling access to the plurality of protected content elements.

In another variant, the method further comprise providing the consumer device access to a cryptographic element enabling access to the plurality of protected content elements, the cryptographic element having a predetermined use period after which the cryptographic element is no longer valid. In one implementation, a first key is to encrypt the segments during a first period, and a second key is to encrypt the segments during a second, subsequent period.

In a second aspect of the invention, a method for ensuring the protection of content provided to one or more IP-enabled user devices is disclosed. In one embodiment, the method includes: receiving a request for a content element from a first user device; authenticating the first user device to access the content element; obtaining the content element as a plurality of segments; generating a first cryptographic element to protect at least some of the plurality of segments; protecting the at least some of the plurality of segments using the first cryptographic element; providing the protected at least some segments to the first user device; providing access to a second cryptographic element to the first user device; after a period of time, generating a third cryptographic element; encrypting the at least some segments using the third element; and providing access to the third cryptographic element to a second user device requesting the content element.

In one variant, protection using a symmetric encryption process is employed, and the first and second cryptographic elements comprise the same symmetric encryption/decryption key. Alternatively, an asymmetric encryption process is used, and the first and second cryptographic elements comprise different encryption/decryption keys.

In another variant, the first and second user devices comprise the same device.

In a third aspect of the invention, apparatus for the delivery of content to a plurality of users of a distribution network is disclosed. In one embodiment, the apparatus includes: first apparatus configured to receive and decode encoded data from at least one content source; second apparatus in communication with the first apparatus and configured to selectively enable at least one of re-encoding and rate adaptation of the decoded data; third apparatus in communication with the second apparatus and configured to monitor the decoded data; and server apparatus configured to serve the re-encoded and/or rate adapted content to the plurality of users.

In one variant, the first apparatus includes a plurality of integrated receiver and decoder apparatus, and the second apparatus includes: a switch apparatus; and a plurality of transcoder apparatus in communication with the switch apparatus.

In another variant, the transcoder apparatus comprise linear transcoder apparatus each configured to transcode the decoded content into a format different than the others.

In yet another variant, a first portion of the plurality of transcoder apparatus includes rate-adaptive transcoder apparatus, and a second portion of the plurality of transcoder apparatus includes non-rate-adaptive transcoder apparatus.

In a further variant, the apparatus further includes an acquisition server in communication with at least one of the transcoder apparatus, the acquisition server configured to multicast at least a portion of the decoded content according to a digital rights management (DRM) paradigm.

In a fourth aspect of the invention, a method of operating a client device in order to obtain content is disclosed. In one embodiment, the method includes: placing the client device in direct or indirect communication with an access network, the access network capable of authenticating the client device in order to determine its entitlement to receive the content; placing the client device in direct or indirect communication with a content cache, the content cache being configured to provide content to the client device upon authentication by the access network; generating a request for the content, the request transmitted to the access network; and in response to the request, receiving the content from the content cache.

In one variant, the receiving the content includes: receiving a plurality of encrypted content segments; and receiving a playlist providing at least information on the playback of the plurality of encrypted content segments.

In another variant, the method further includes obtaining from the access network a decryption key capable of decrypting the plurality of encrypted content segments.

In a further variant, the access network includes a managed network with a plurality of subscribers, the client device being associated with a subscriber of the managed network. Authenticating the client device in order to determine its entitlement to receive the content includes checking the subscription level of the subscriber, and/or verifying at least one of a MAC address and/or IP address.

In another variant, communication between the client device and access network is conducted at least in part according to a secure HTTP protocol, and communication between the client device and the content cache is conducted at least in part according to an HTTP protocol. In a fifth aspect of the invention, computer readable apparatus is disclosed. In one embodiment, the apparatus includes a storage medium capable of storing at least one computer program thereon. In one embodiment, the at least one program comprises an application for use on a client device (e.g., mobile IP-enabled content rendering device) which, when executed, invokes authentication of the client device and/or user in order to allow the client device to receive and render content.

In another embodiment, the at least one program comprises middleware disposed on a cable modem or gateway apparatus within a subscriber premises, the middleware enabling communication of content requests from an associated IP-enabled user device, forwarding of information (e.g., cookies) from the IP-enabled device to a host network to enable authentication and/or verification of entitlement to access the requested content, and forwarding of received content segments, decryption keys, and playlist data to the IP-enabled device in order to facilitate playback of the content.

In a sixth aspect of the invention, an IP-enabled client device is disclosed. In one embodiment, the device comprises a mobile wireless content rendering device that communicates with an access point of a network, the access point being in communication with a content distribution network. The mobile device is configured to receive guide data from the distribution network, request content therefrom via the access point, and receive content which can then be rendered on the mobile device. In one variant, the mobile device receives a plurality of encrypted MPEG transport stream (.ts) files and a playlist for the files, and is directed to obtain a decryption key from a URL upon proper authentication.

In a seventh aspect of the invention, a managed network architecture is disclosed. In one embodiment, the managed network architecture enables delivery of packetized (e.g., IP) content to user devices without use of high-speed data service infrastructure.

In an eighth aspect of the invention, a method of doing business is disclosed. In one embodiment, the method comprises providing a separate service class (e.g., mobile IP data) for network users/subscribers that is decoupled from high-speed data service provided by the same network; i.e., IP delivery without the need for high-speed data service.

These and other aspects of the invention shall become apparent when considered in light of the disclosure provided herein.

Figure 1:
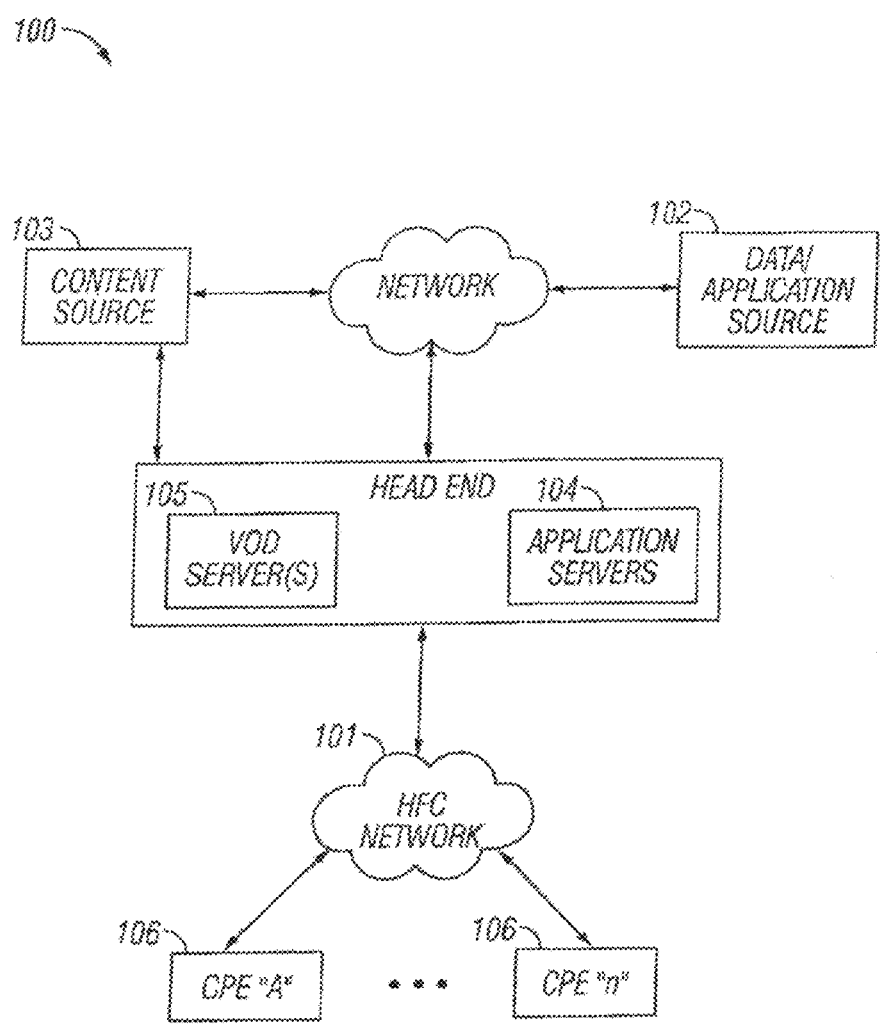
FIG. 1 is a functional block diagram illustrating an exemplary HFC cable network configuration useful with the present invention.

All Figures© Copyright 2011 Time Warner Cable, Inc. All rights reserved.

DETAILED DESCRIPTION OF THE INVENTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Consumer Premises Equipment (CPE)" and "host device" refer without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "DOCSIS" refers to any of the existing or planned variants of the Data Over Cable Services Interface Specification, including for example DOCSIS versions 1.0, 1.1, 2.0 and 3.0.

As used herein, the term gateway includes, without limitation, devices configured to interface with a network, and pass signals to or exchange signals with, another device in communication therewith. Various exemplary gateways are described in, inter alia, co-owned U.S. patent application Ser. No. 11/818,236 filed on Jun. 13, 2007 entitled "PREMISES GATEWAY APPARATUS AND METHODS FOR USE IN A CONTENT-BASED NETWORK", and issued as U.S. Pat. No. 7,954,131 on May 31, 2011, U.S. patent application Ser. No. 12/582,619 filed on Oct. 20, 2009, entitled "GATEWAY APPARATUS AND METHODS FOR DIGITAL CONTENT DELIVERY IN A NETWORK", and issued as U.S. Pat. No. 9,027,062 on May 5, 2015, and U.S. patent application Ser. No. 12/480,597 filed on Jun. 8, 2009, entitled "MEDIA BRIDGE APPARATUS AND METHODS", and issued as U.S. Pat. No. 9,602,864, each of the foregoing being incorporated herein by reference in its entirety.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the term "node" refers to any functional entity associated with a network, such as for example an OLT or ONU, whether physically discrete or distributed across multiple locations.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer system or network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers without limitation to either a group of service users (e.g. subscribers), or the resources shared by them in the form of for example entire cable RF signal, only the RF channels used to receive the service or otherwise treated as a single logical unit by the network for resource assignment.

As used herein, the term "Wi-Fi" refers to, without limitation, any of the variants of IEEE-Std. 802.11 or related standards including 802.11a/b/g/n/s/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

In one salient aspect, the present invention discloses methods and apparatus for providing content to a plurality of IP-enabled devices serviced by a content distribution network. In one exemplary embodiment, a network architecture is disclosed which enables delivery of content to such IP-enabled devices without the use of a high-speed data service; i.e., via another distribution platform (such as for example a traditional CATV or other managed distribution network DOCSIS or in-band QAMs). This capability allow the managed network operator to provide audio/video content services to an IP-enabled device (e.g., mobile wireless content rendering device such as a smartphone or tablet computer) associated with a non-data subscriber of the operator's network. For example, an MSO is, utilizing the exemplary apparatus and methods described herein, able to make content delivery services available to a subscriber's tablet computer (e.g., iPad) when the owner thereof does not subscribe to the MSO's high-speed data network or services, and instead only subscribes to the MSO's video services. This approach advantageously enables a user to receive content on IP-enabled devices, which are generally more mobile than non-IP devices, thereby enhancing the user experience by allowing the user to received the content at various locations (as well as that specified in the subscription agreement; e.g., at the subscriber's premises). It also provides the basis for alternate business models for the network operator; i.e., since provision of IP-based content is no longer tied to high-speed data services, a larger customer base can be reached, and with greater flexibility and available options/combinations and locations.

In the exemplary implementation, extant network structure and function (e.g., DOCSIS or in-band QAMs of an HFC network) are utilized to the maximum extent in order to minimize MSO investment in providing such services, thereby also enhancing rapid incorporation of the technology and provision of services to the users/subscribers.

In one embodiment, requests for content from user IP-enabled devices are received, authenticated, and the content processed into a series of encrypted segments (e.g., in MP4 format or the like). Once the requesting user/device is authenticated, the segments are provided with a playlist instructing the IP-enabled rendering device how to play them back (once decrypted). The rendering device is also provided access to a decryption key (e.g., via a URL to a managed key server) enabling decryption of the segments. Keys are dynamically managed in one variant in order to keep them "fresh" and mitigate chances for surreptitious use.

Variants providing (i) user access to the MSO distribution network via an indigenous modem or gateway disposed at a user's premises; and (ii) user access to the MSO core via a gateway and a third party unmanaged network (such as the Internet), are described.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber/coax (HFC) cable system architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature. For example, the invention may be practiced over a fiber-to-the-home (FTTH) or fiber-to-the-curb (FTTC) system, HFCu networks, or over satellite or millimeter wave-based networks.

It will also be appreciated that while described generally in the context of a consumer (i.e., residential) end user domain, the present invention may be readily adapted to other types of environments (e.g., commercial/enterprise, government/military, etc.) as well. Myriad other applications are possible.

It is further noted that while exemplary embodiments are described primarily in the context of a hybrid fiber/conductor (e.g., cable) system with legacy 6 MHz RF channels, the present invention is applicable to literally any network topology or paradigm, and any frequency/bandwidth. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Other features and advantages of the present invention will immediately be recognized by persons of ordinary skill in the art with reference to the attached drawings and detailed description of exemplary embodiments as given below.

Network

FIG. 1 illustrates a typical content distribution network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104 or other network component.

Figure 1A:
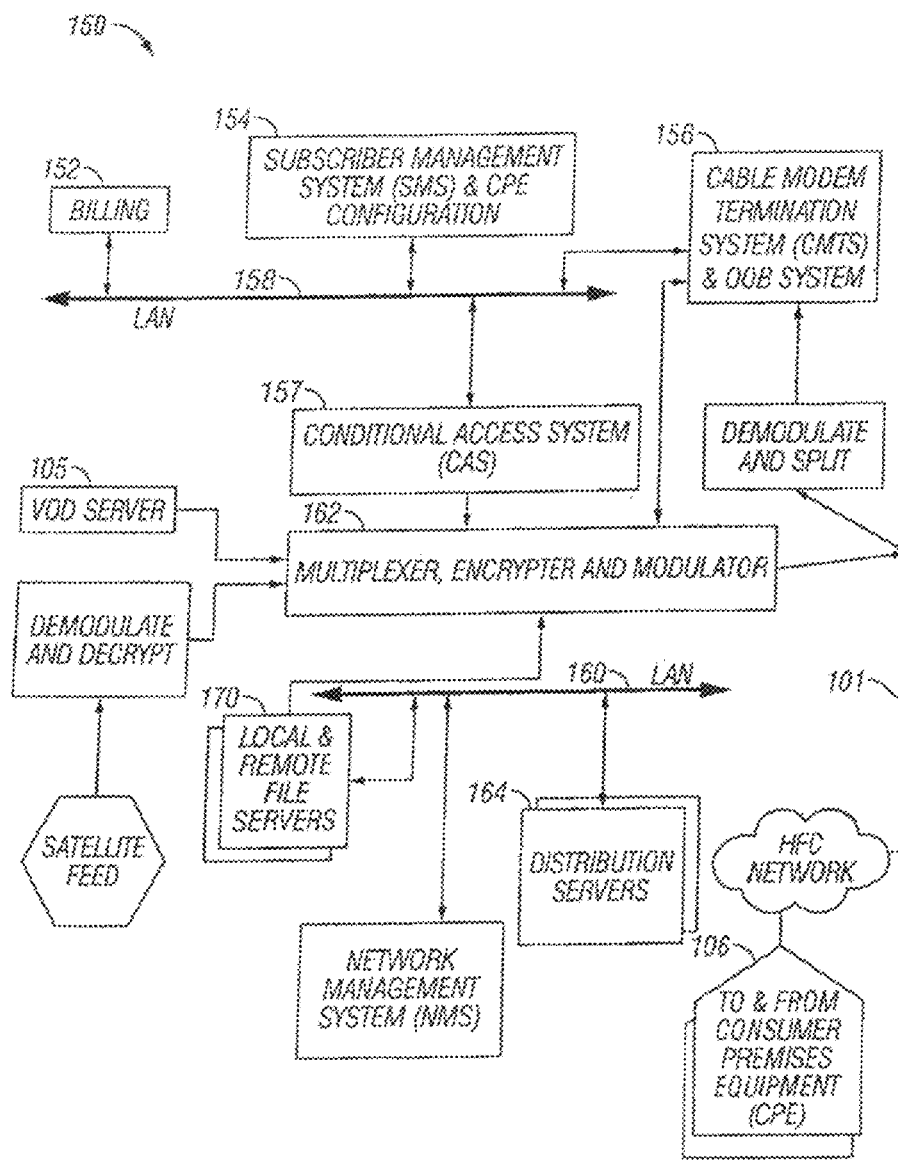
FIG. 1a is a functional block diagram illustrating one exemplary HFC cable network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the headend configuration depicted in FIG. 1a is high-level, conceptual architecture, and that each MSO may have multiple headends deployed using custom architectures, which may or may not be heterogeneous in layout, design, and/or functionality.

Figure 1B:
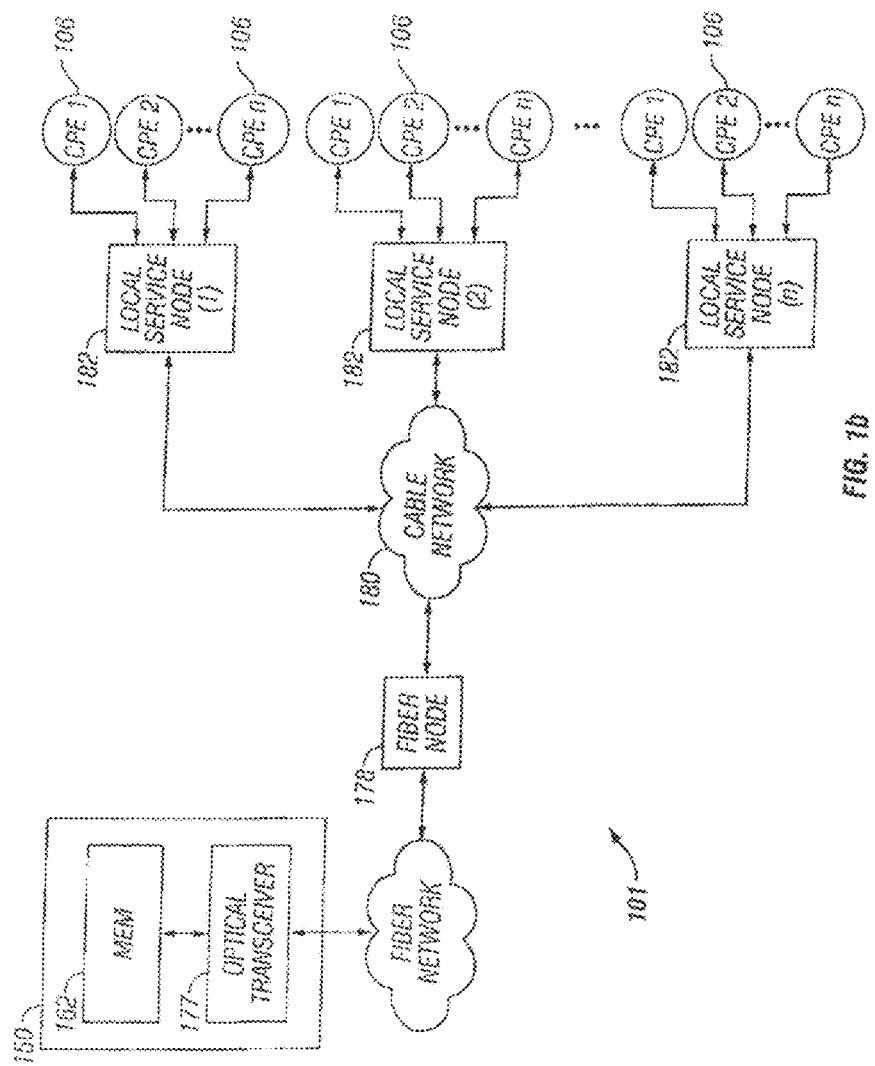
FIG. 1b is a functional block diagram illustrating one exemplary local service node configuration useful with the present invention.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1b) via a variety of interposed network components.

Figure 1C:
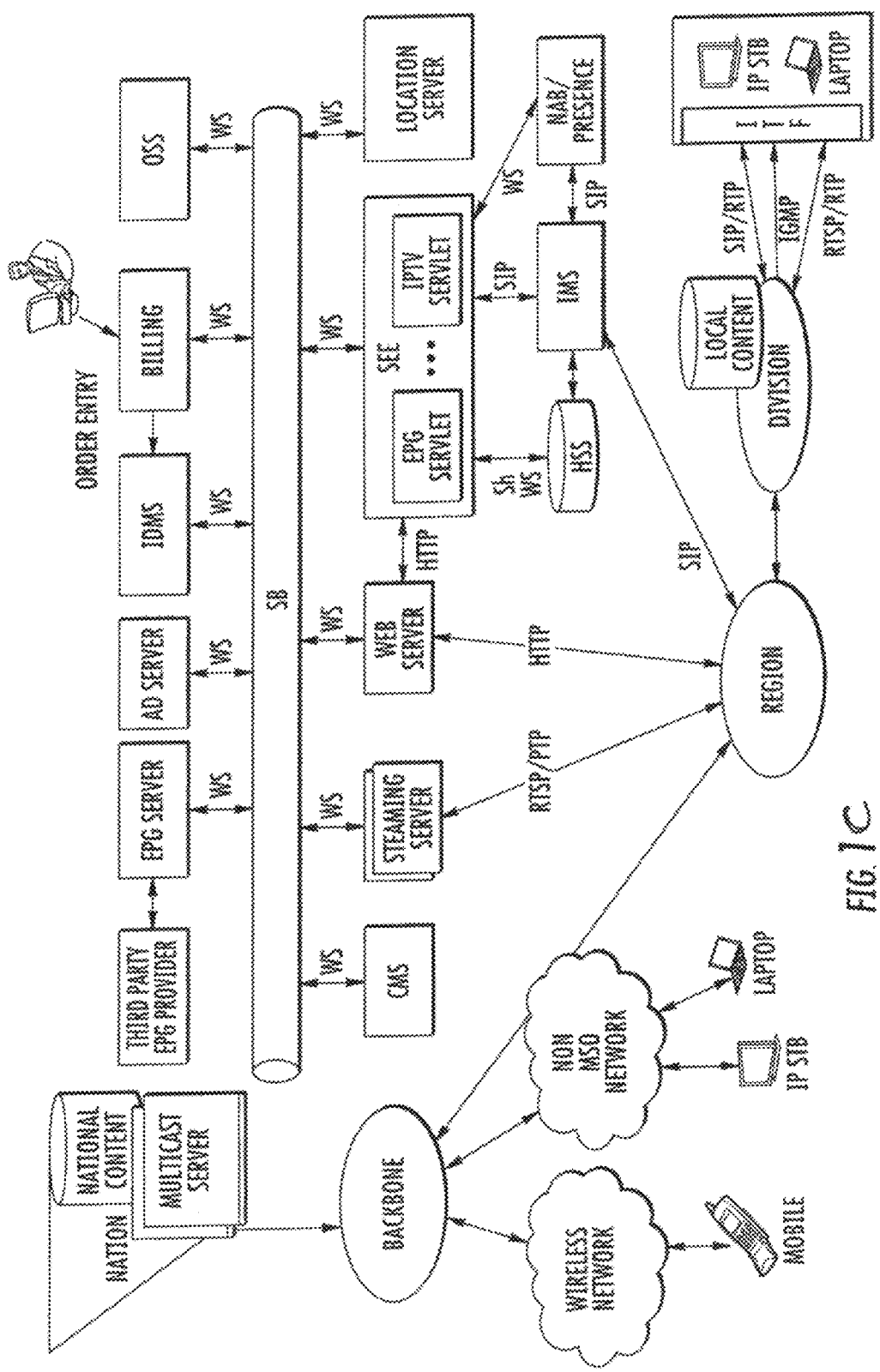
FIG. 1c is a functional block diagram illustrating one exemplary packetized content delivery network architecture useful with the present invention.

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, software images, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Packetized" Networks

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" distribution network is used for carriage of the packet content (e.g., IPTV content). FIG. 1c illustrates one exemplary implementation of such a network, in the context of a 3GPP IMS (IP Multimedia Subsystem) network with common control plane and service delivery platform (SDP), as described in U.S. patent application Ser. No. 12/783,388 filed on May 19, 2010, entitled "METHODS AND APPARATUS FOR PACKETIZED CONTENT DELIVERY OVER A CONTENT DELIVERY NETWORK", and issued as U.S. Pat. No. 8,516,529 on Aug. 20, 2013, which incorporated herein by reference in its entirety. Such a network provides significant enhancements in terms of, inter alia, common control of different services, implementation and management of content delivery sessions according to unicast or multicast models, etc.; however, it is appreciated that the various features of the present invention are in no way limited to any of the foregoing architectures.

Exemplary Network Architecture

Figure 2C:
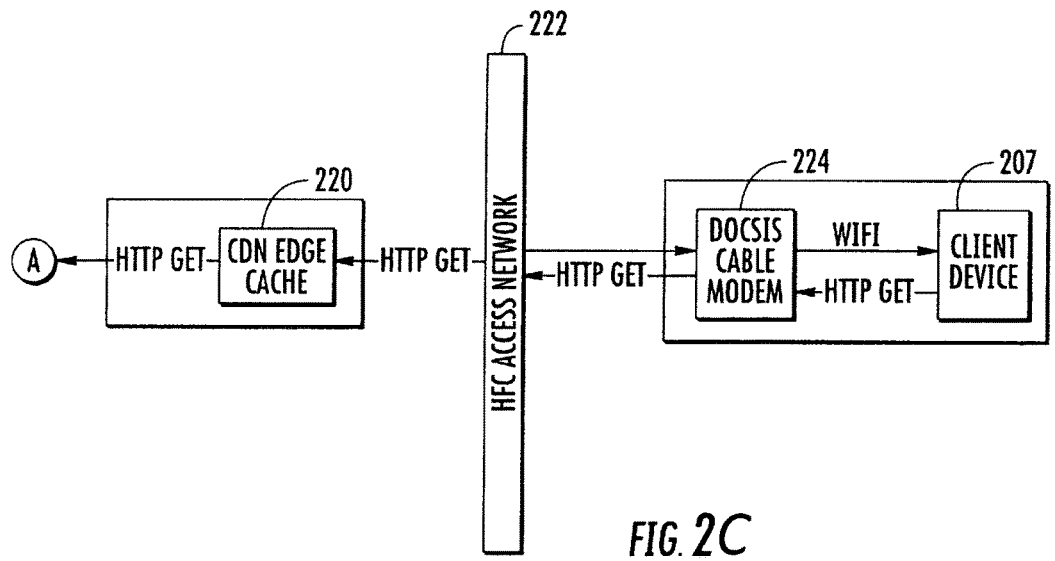
FIGS. 2b-2c are functional block diagrams illustrating one exemplary embodiment of a content distribution network architecture for providing content to an IP-enabled device according to the present invention.
Figure 2A:
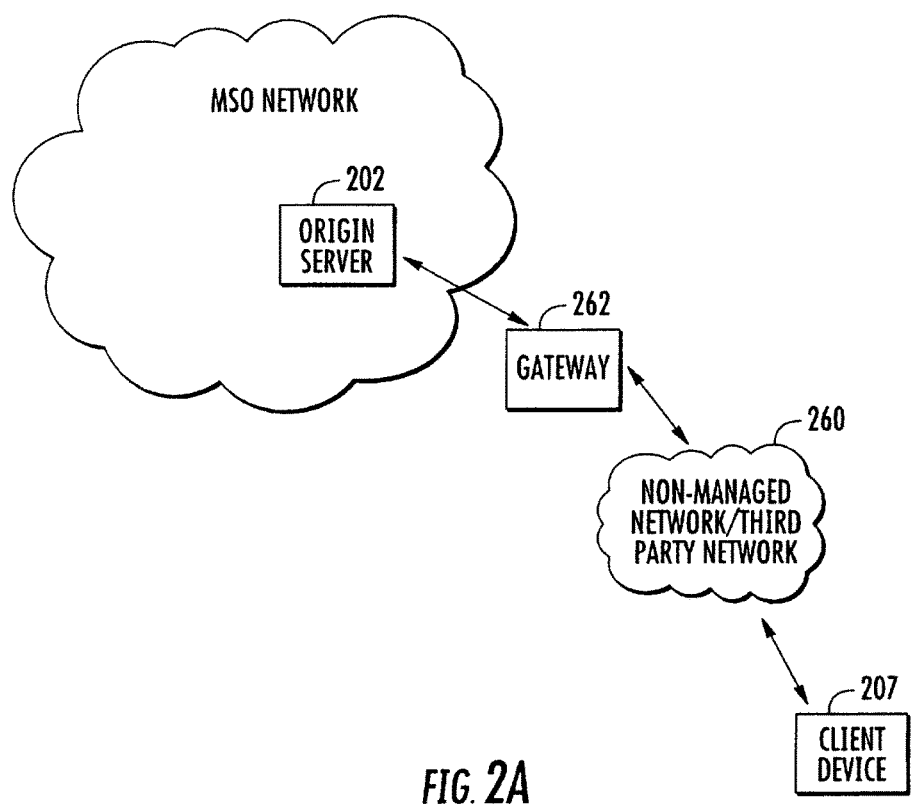
FIG. 2a is a functional block diagram illustrating an alternate embodiment of a content distribution network.
Figure 2B:
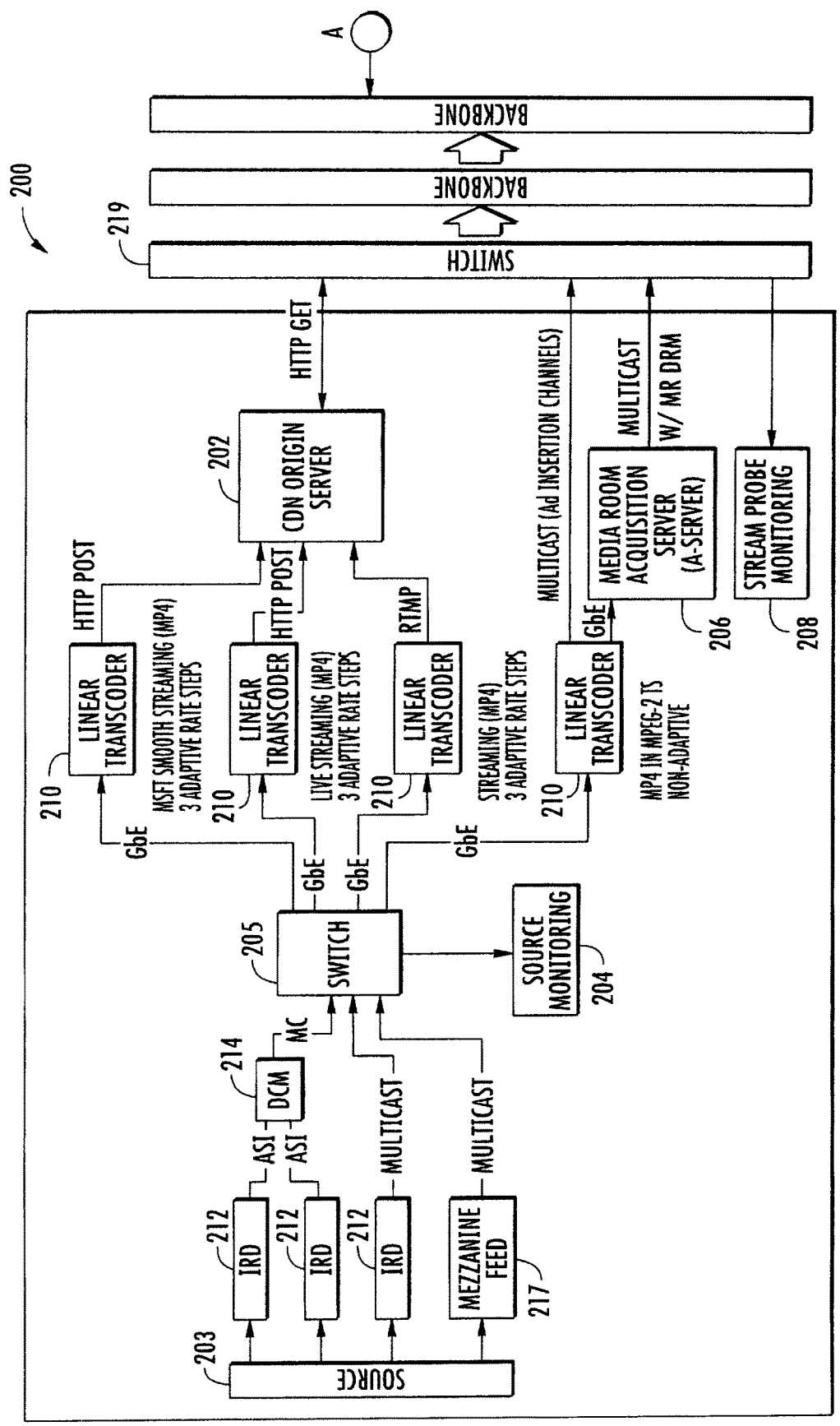

Referring now to FIGS. 2b-2c, an exemplary embodiment of a network architecture 200 for providing content to an IP-enabled client device 207 in a content distribution network according to the present invention is illustrated. It will be appreciated that the architecture 200 of FIGS. 2b-2c can be used in conjunction with any of the foregoing network content distribution architectures (i.e., those of FIGS. 1-1c discussed supra), or can form the basis of its own distribution and delivery architecture.

As illustrated, content is provided from a national headend content source 203 to a series of integrated receiver/decoders (IRD) 212 of the content distribution network. The content comprises for example, live streaming content, although other types of content or data may be readily distributed. The IRDs 212 receive and decode the content. A digital content manager (DCM) 214 manages transmission of the decoded content from at least some of the IRDs 212 to a network switch 205.

In one embodiment, one or more IRDs 212 utilize an asynchronous serial interface (ASI) for transmission of content and other data to the DCM 214. The DCM 214 monitors the encoded video to ensure that it was successfully encoded from the IRD. As discussed previously, video is transcoded from a mezzanine quality down to e.g., MPEG-4. The DCM 214 monitors the decoding of the high quality satellite feed prior to transcoding. Additionally, content is multicast from the IRD 212 and/or a mezzanine feed 217 directly to the network switch 205. This occurs for example, in the instance that the output from an IRD is already encoded properly; i.e., it will not need to be processed, converted and/or monitored by the DCM 214. Alternatively, this may enable advertisement insertion or multi-room (or so-called "media-room") functionality.

The network switch 205 provides the received and decoded content to a plurality of linear transcoders 210 via e.g., a Gigabit Ethernet (GBE) or 10 Gigabit (10G) connection. The network switch 205 provides data to a source monitoring entity 204, which in one embodiment monitors the capacity of the switch.

The linear transcoders 210 receive the content from the network switch 205, and perform the necessary adaptive and/or non-adaptive rate steps to transcode and/or transrate content to any number of different desired formats such as e.g., Microsoft® Smooth Stream™ (MP4), Apple® Live Streaming™ (MP4), and Adobe Streaming®, for distribution of this content as a linear broadcast (multicast). As is well known, the exemplary MP4 format is a container format which allows, inter alia, combination of different multimedia streams (e.g., audio and video) into a single file. MP4 is a file extension for the container format defined in the Systems Part of the MPEG-4 standard (ISO 14496-1), incorporated herein by reference in its entirety. MP4 supports different kinds of multimedia content (multiple audio streams, video streams, subtitle streams, pictures, etc.) and advanced content (also referred to as "Rich Media" or "BIFS") such as 2D and 3D graphics, user interactivity, and DVD-like menus. MP4 is a (linear) streamable format.

Although not illustrated, the linear transcoders 210 may perform the necessary rate steps to transcode/transrate the received content into any number of transport streams or streaming protocol, the foregoing being merely illustrative of the general concepts and of the common protocol used by typical IP-enabled client devices 207.

The transcoded and/or transrated content is provided to a content distribution network (CDN) origin server 202 using e.g., Hypertext Transport Protocol (HTTP) POST request methods, Real-Time Messaging Protocol (RTMP), or any other appropriate protocol. As will be discussed in greater detail below, the CDN origin server 202 stores the content to service requests from the IP-enabled devices 207.

One or more transcoders 210 may also be used to transcode the content to MP4 in MPEG-2 transport stream (TS) format in a non-rate adaptive manner. The non-rate adaptive format may be used in this case because the stream has a constant bit rate (CBR) at this stage. Utilization of the MPEG-2 TS container enables the MP4 content to be multicast to a plurality of devices on the network. Additionally, the MPEG-2 TS content may be delivered with advertisement or other "secondary" content inserted therein via one or more intermediary advertisement insertion mechanisms (not shown). Exemplary apparatus and methods for selection of secondary content to be inserted (e.g., via a "targeted" approach) are described in co-owned and co-pending U.S. patent application Ser. No. 11/186,452 filed on Jul. 20, 2005 and entitled "METHOD AND APPARATUS FOR BOUNDARY-BASED NETWORK OPERATION", U.S. patent application Ser. No. 12/284,757 filed on Sep. 24, 2008, entitled "METHODS AND APPARATUS FOR USER-BASED TARGETED CONTENT DELIVERY", issued as U.S. Pat. No. 9,071,859 on Jun. 30, 2015, and U.S. patent application Ser. No. 12/766,433 filed on Apr. 23, 2010 and entitled "APPARATUS AND METHODS FOR DYNAMIC SECONDARY CONTENT AND DATA INSERTION AND DELIVERY", each of which is incorporated herein by reference in its entirety, although other approaches may be used with equal success.

As shown in FIG. 2b, one or more transcoders 201 may also be used to deliver (via e.g., multicast) one or more channels carrying advertising or other secondary content directly to one or more downstream nodes (e.g., switches 219) for subsequent insertion at a downstream location; i.e., at the switch 219 or further downstream).

Content and data are additionally provided from the MPEG-2 TS linear transcoders 210 to an acquisition server (A-server) 206. Then, via the A-server 206, the content is multicast to a plurality of other devices including those having IPTV server platform with digital rights management (e.g., the Microsoft MediaRoom® platform or MR DRM) options available. The content is provided from the A-server 206 to the switch for eventual delivery to consumers.

Another monitoring entity 208 is also provided as part of the exemplary architecture 200. In one embodiment, this entity 208 comprises a Cheetah Technologies® Stream Probe™ monitoring entity, although it will be recognized that other solutions or technologies may be employed with equal success. The monitoring entity in the exemplary embodiment provides analysis of IP and MPEG video coding layer attributes, in order to ensure network transmission trends and events are reported. In this manner, the network 200 can detect impairments and degradations in real-time. Generally, the monitoring entity 208 uses information fed back from the switch(es) 219. The monitoring entity 208 uses this information to monitor transcoded MPEG-4 content after it has been transcoded or down-sampled.

The illustrated network architecture 200 of FIGS. 2b-2c depict content delivery to an exemplary IP-enabled client device 207. As shown, the device 207 is configured to receive content via a WLAN (e.g., Wi-Fi) or other interface to WLAN-enabled DOCSIS cable modem or gateway 224 using an HTTP GET command. The use of a substantially ubiquitous protocol/request mechanism such as the aforementioned HTTP GET command advantageously allows a variety of different user device types to interface with the modem/gateway 224. Specifically, the modem/gateway 224 can, in the illustrated embodiment, merely pass the user device-originated GET command upstream to the origin server 202 without any conversion or translation of the command. It will be appreciated by those of ordinary skill that such translation can be utilized if desired, such as where the indigenous protocol of the requesting user device 207 does not support the same request/delivery protocol as the origin server 202.

The cable modem 224 in turn requests the content (using an HTTP GET command) from a CDN edge cache 220 which is disposed at or near the edge of the network. In one variant, the modem 224 is placed at the switch 219, or elsewhere in the network based on operational considerations.

The cable modem or gateway 224 utilized herein may be of the type discussed in previously referenced co-owned U.S. patent application Ser. No. 13/403,814 entitled "APPARATUS AND METHODS FOR CONTENT DISTRIBUTION TO PACKET-ENABLED DEVICES VIA A NETWORK BRIDGE" filed Feb. 23, 2012 and issued as U.S. Pat. No. 9,426,123 on Aug. 23, 2016. As discussed therein, in one embodiment, the cable modem 224 only points at the root server 202 or other servers in the content distribution network. That is, the cable modem/gateway 224 may be limited to only retrieve content for delivery to the IP-enabled devices.

In another embodiment, the cable modem/gateway 224 is able to act as a client of an access point distributed and managed by another content distribution network (i.e., a content distribution network other than that hosting or sourcing the requested content). In this manner, the access point merely views the cable modem 224 as a device associated to the third party access point and which is able to receive content therefrom. The cablem modem, in a manner similar to that discussed above, is identified by the content distribution network, and therefore able to receive requested content from the distribution network. In other words, rather than using the wireless access of the cable modem associated with the content distribution network, the cable modem acts as an intermediary between a client device 207 and the content delivery network by registering as a client of a third party access point.

The edge cache 220 rests at the edge of the network, and is accessible via a bearer network (e.g., HFC network) access network interface 222. The HFC access network interface 222 in one exemplary embodiment comprises a web services interface managed by the content distribution network 200. The edge cache 220 requests content (using e.g., an HTTP GET command) from the origin server 202 further upstream in the network.

Alternatively or in addition, the edge cache 220 may store popular content for provision to the cable modem/gateway 224 and requesting device 207 more efficiently. In one variant, the methods and apparatus discussed in co-owned U.S. patent application Ser. No. 11/726,095 filed on Mar. 20, 2007 and entitled "METHOD AND APPARATUS FOR CONTENT DELIVERY AND REPLACEMENT IN A NETWORK", which is incorporated herein by reference in its entirety, may be utilized for identifying and storing content at the network edge (such as at the edge cache 220). As discussed therein, a peer-to-peer architecture is utilized to provide acquisition, delivery, and reconstitution of content present within the network. In one embodiment, approach described therein has many potential benefits including, for example, the ability to push at least some network bandwidth consumption out to the edge of the network (e.g., hubs or other distribution nodes), thereby conserving bandwidth at the core of the network, the latter which can often be the most critical or bandwidth constrained portion of the system. Moreover, requests outside the MSO network are in some cases obviated, thereby conserving resources in this regard. Latency can also be reduced in some cases (e.g., where the network is over-subscribed), since the requested content is acquired and distributed locally versus having to come from the core (or a third-party content source routed through the core or other network infrastructure).

In another variant, the apparatus and methods of co-owned U.S. patent application Ser. No. 11/904,375 filed on Sep. 26, 2007 entitled "METHODS AND APPARATUS FOR CONTENT CACHING IN A VIDEO NETWORK", and issued as U.S. Pat. No. 8,861,116 on Oct. 15, 2013, which is incorporated herein in its entirety, may be utilized consistent with the present invention to provide "intelligent" caching and de-caching of content within the network using on-demand or other user-specified delivery mode. As discussed therein, the "intelligent" caching addresses issues relating to the trade-off between content storage space and transcoding/transrating/transcrypting efficiencies within the system that occur as a result of trying to support a broad range of end-user device profiles and capabilities. By evaluating the demand for certain content elements and/or encoding formats and rates within the network, and identifying "duplications" of requests (or alternatively, the "proximity" of one request to another in content/encoding/bitrate/encryption space), a caching controller is able to dynamically balance caching of multiple versions of a content element (e.g., movie) and the need for "on the fly" transcoding/transrating/transcryption and associated assets. In this fashion, greater efficiencies and economies of scale in operating the network can be realized while simultaneously supporting a wide range of devices. Thus, content which is requested more often can be "intelligently" stored at a content cache at the network edge, such as e.g., the edge cache 220 of FIGS. 2b-2c herein.

It will further be appreciated that while the exemplary architecture of FIGS. 2b-2c contemplates the communication of content request (e.g., via HTTP GET commands) from, and the provision of content to, the IP-enabled user device via a managed network (e.g., MSO-operated CATV, satellite, or HFCu network), the invention may also be implemented such that the user/subscriber is not limited to utilizing access points which are serviced by such networks. For instance, in an alternate embodiment (FIG. 2a), the transcoded/transrated and segmented content and playlist are delivered to the IP-enabled device over a non-managed network or third party network 260 such as the Internet. In one embodiment the aforementioned .ts segmenting protocol is utilized. A network gateway 262 is utilized to interface the non-managed network 260 to the managed network 264 (e.g., CATV network), such that the non-managed network 260 acts as the distribution network or "edge" of the (core) managed network 264 for purposes of distributing the content. The content/playlist is in this embodiment literally run over the top of the non-managed network, such as via an IP-based transport (as opposed to the MPEG transport stream of the prior embodiment). The embodiment of FIG. 2a advantageously provides MSO-network users or subscribers the ability to access IP content via any number of non-managed network access points (e.g., WLAN APs operated by third parties with connection to the Internet via e.g., an ISP).

In one variant, the foregoing approach utilizes the methods and apparatus discussed in co-owned U.S. patent application Ser. No. 12/834,801 filed on Jul. 12, 2010, entitled "APPARATUS AND METHODS FOR CONTENT DELIVERY AND MESSAGE EXCHANGE ACROSS MULTIPLE CONTENT DELIVERY NETWORKS", and issued as U.S. Pat. No. 9,906,838 on Feb. 27, 2018, which is incorporated herein by reference in its entirety. As discussed therein, protected content is provided to subscribers of a managed (e.g., MSO) network via a content source accessible to the subscriber via the Internet or another external network (such as the non-MSO managed network 260 of FIG. 2a). In one embodiment, a user accesses a third party service provider (content source) website, and requests delivery of content (e.g., via on-demand type streaming, broadcast, high speed file download, etc.). If the particular content requested is protected content or content which is only accessible to certain types of subscribers, the service provider and/or MSO determines whether the requesting user is permitted to access the content. The process by which it is determined whether a user may access content includes (i) authenticating the user as a subscriber to the MSO, and (ii) determining whether the subscriber's service/subscription level permits viewing of the requested content (and optionally one or more use restrictions). The process is advantageously agnostic to the underlying networks involved in both the request and content delivery processes.

In one variant, the user is authenticated by requiring him/her to establish a login identity and password, and/or assigning the user a GUID. The user's MAC address or IP address may also be used in this process. This unique information is stored at an MSO entity, and when the user requests content, the user must log into the MSO; the relevant information is retrieved and compared to information that the user has provided in their login. If valid login information is entered (i.e., the information provided matches the stored information for that user GUID), then a session is created between the MSO and user. Additionally, the authentication checks discussed in FIGS. 5-5a below may be utilized.

In another variant, the service provider and MSO accounts for a particular user may be linked or federated. In other words, a trust relationship is established between the service provider and MSO, which is used to verify subscriber information. According to this embodiment, a given user will have MSO-specific information regarding its identity (such as login information for the MSO, GUID, etc.), and/or information regarding its subscription level and other service details stored at the service provider site. Messages received from the MSO representing permission for the user to access content may also be stored at the service provider site. The service provider may later reference this information when subsequent requests for content are made by the user for content, thereby providing faster and more efficient service.

Encryption/Decryption Apparatus and Methods

Figure 3:
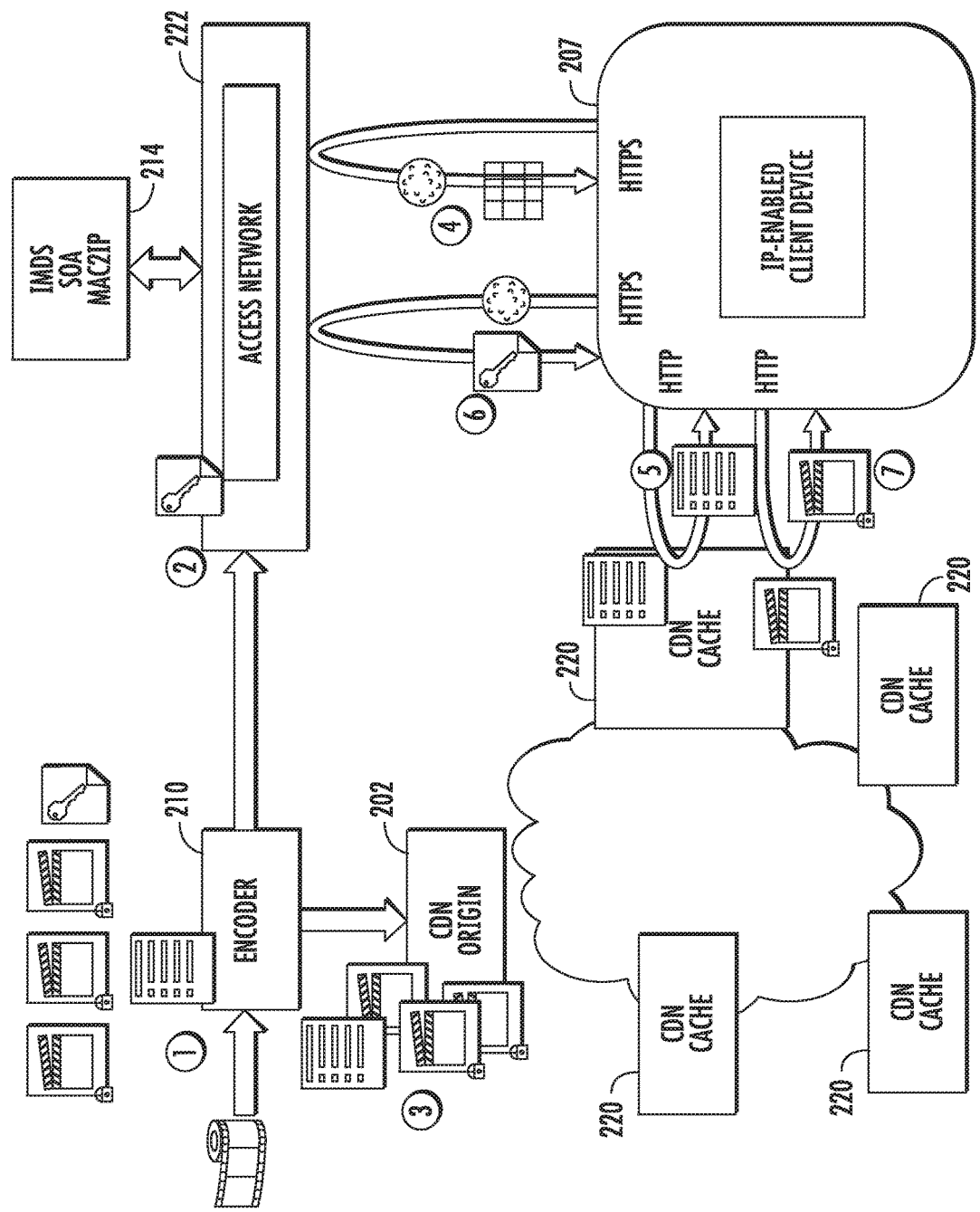
FIG. 3 is a logical block diagram illustrating an exemplary embodiment of a network architecture for encrypting content for delivery to an IP-enabled device via a content distribution network, such as the exemplary network of FIGS. 2b-2c.

FIG. 3 illustrates an exemplary embodiment of a network apparatus utilized for providing encryption/decryption of the content provided to the IP-enabled devices 207. Content is provided to the devices in encrypted format for, inter alia, protection thereof during transmission. In one exemplary embodiment, content is encrypted using Advanced Encryption Standard (AES) encryption mechanisms of the type well known in the cryptography arts. Accordingly, a single key is used for both encryption and decryption (symmetric-key encryption), although it will be appreciated that non-symmetric or asymmetric encryption techniques may be sued as well.

In the illustrated embodiment, the encoder 210 generates the content encryption/decryption key, which is published to the access network. The access network in this case may be the access network 222 (e.g., HFC managed network) previously described herein with respect to FIG. 2c, or yet another topology/architecture. Additionally, the encoder 210 segments and encodes the content, which is then transmitted (published) to the origin or root server 202 (FIG. 2b) for storage thereat. In one embodiment, the segmented content is stored at the origin server 202 as a plurality of MPEG transport stream files (i.e., .ts files) as specified in MPEG-2 Part 1, Systems (formally known as ISO/IEC standard 13818-1 or ITU-T Rec. H.222.0), which is incorporated herein by reference in its entirety. Other formats may be used as well.

A playlist of all of the segments (or .ts files) which comprise a given content element is also generated by the encoder 210 during the segmenting process. The playlist (also commonly referred to as a manifest or index) is likewise provided or published to the origin server 202. In one embodiment, the playlist may comprise an M3U file (such as e.g., a UTF-8 unicode file (i.e., an .m3u8 file)). Generally, an M3U file is a plain text file that specifies the locations of one or more media files, such as the .ts files, comprising a given content element (e.g., movie or video clip). Each line of the M3U file carries a URL associated to the various .ts files making up the playlist. The playlist may, in one variant, also contain an M3U file containing a URL to the content decryption key. Alternatively, the URL to the content decryption key for a given content element may be listed in the M3U file which also lists the URLs for the individual content segments.

FIG. 3 further illustrates interaction of the IP-enabled client device 207 with the edge cache 220 and access network 222 of FIG. 2c. It is via the illustrated interactions that the device 207 is able to obtain the encryption/decryption key, obtain the content, and decrypt and access the content.

It will be appreciated that while the embodiment of FIG. 3 illustrates communications between the access network 222 and the user device 207 via the HTTP protocol, and communication between the user device 207 and the content cache 220 via the HTTPS protocol, other protocols may readily be used consistent with the invention, As is well known, the Hypertext Transfer Protocol Secure (HTTPS) is a commonly used protocol, effectively a combination of the Hypertext Transfer Protocol (HTTP) with SSL/TLS protocol) which provides for encrypted communication and secure identification of a network web server.

As will be discussed in greater detail below, in order for the managed or host network to ensure that the device is authorized to receive content, one or more authentication checks must be performed prior to delivery of the content and the content key thereto. In one implementation of the invention, a three-tier or check approach is utilized. Specifically, a first authentication check determines whether the user is a registered user/subscriber of the MSO-provided services. In one embodiment, this includes requiring the user of the IP-enabled device 207 to log-in to the services via the access network 222. A second authentication check determines whether the requesting device is within a home network or other premises serviced by the MSO. In one embodiment, this second authentication check includes determining whether the IP address of the cable modem/gateway 224 associated with the requesting device 207 is among the cable modems or gateways registered to the MSO (whether leased or other). Yet a third authentication check determines whether the user himself is authorized or entitled to view the content; i.e., irrespective of the other checks. In one embodiment, this third check may include determining a subscription level of the user (or whether a user has provided consideration to the MSO for gaining access to the content, such as on a pay-per basis), and applying an appropriate filter to the content which can be requested thereby. Each of the foregoing authentication/entitlements checks are discussed in greater detail subsequently herein.

As noted above, the exemplary network of FIG. 3 utilizes symmetric-key encryption to encrypt content. Hence, in order to decrypt received content, the device 207 must be given the encryption/decryption key. As discussed above, the encryption/decryption key is generated by the transcoder 210 and distributed to the origin server 202, edge cache 220, or the access network 222. The playlist, which is also stored at the origin server 202 as noted above, contains a reference to the URL of the key.

When the client device 207 logs in and is authenticated (see login as discussed below with respect to authentication/entitlements) to the access network 222, it receives program guide data and an encrypted cookie. As a brief aside, a cookie (also known as an HTTP or HTTPS cookie, web cookie, or browser cookie) is an arbitrary piece of textual data used for an origin website or server to send state information (i.e., information relating to previous events, akin to a memory) to a user's browser, and/or for that browser to return state information to the origin site/server. The state information can be used for any number of purposes including without limitation authentication, identification of a user/user session, user preferences, etc. Without cookies, each retrieval of a Web page or component of a Web page is an isolated event effectively unrelated to all other interactions with the pages of the same site. Cookies may also be set via other means, such as e.g., via a script in a language (e.g., JavaScript).

The subscriber uses the received guide to select a content element (e.g., program) for viewing. The program selection is transmitted as a request to the CDN edge cache 220. In response to the request, the playlist for the selected content element is provided to the device 207. The playlist, as noted above, includes a URL to the content encryption/decryption key. Hence, when the client device 207 receives the playlist, it is pointed to the URL to obtain the key.

The client device 207 uses the URL as part of a request for the key from the key server, the latter which may include any one of e.g., the root server 202, the edge cache 220, the access network 222, or other entity in communication with the access network 222 (not shown). Alternatively, the key server may comprise a protected key storage on the CDN. In one embodiment, the keys are generated at e.g., the encoders 210, however it is appreciated that any of the hereindescribed entities may be utilized for such purposes. In order to request the key, the device 207 presents the server entity with the previously received cookie (after it is decrypted). The key server can then determine whether the cookie presented is appropriate for the requesting device, such as by cross-checking the cookie-device pair against stored information. This may include generating information linking an IP address, MAC address, or other identifying information of the device or location thereof to the particular cookie at the time the cookie was distributed thereto, then referencing this information when the key is requested.

If the requesting device 207 has presented an appropriate cookie (i.e., the device is authenticated), the encryption/decryption key is provided thereto. The key may be presented in encrypted or decrypted form; for instance, in one variant, the AES key itself is encrypted using a public-private key pair for which the requesting device is given (or already possesses) the key, so as to permit access to the AES key. Other cryptographic techniques may also be used to ensure the integrity of the key and/or limit chances of its being maliciously used or modified, such as e.g., a cryptographic residue or one-way hash for integrity protection.

Once the AES key is obtained in the clear, the client device 207 may then use the key to decrypt and play the content fragments (e.g., .ts files received from the edge cache 220) which correspond to those listed in the playlist.

In one implementation of the invention, the encoder periodically or anecdotally rotates the content encryption/decryption key (pointing to the URL of the new key). In addition, the content fragments are re-encrypted with the new key. The device 207 may in one embodiment identify that a new key is available when it is discovered that its key is out of date (i.e., no longer to decrypt received content). Alternatively, the device 207 may know or be signaled to request a new key. In one variant, when a new key is available, the device 207 must request a new playlist, which will contain a reference to the URL of the new key. The device 207, in turn, requests that the new key from the key server. The device 207 continues to be authenticated to the server by presentation of the cookie thereto.

Generally, new key fetches as discussed herein occur quickly enough to occur before new playlist data and/or content decryption is required for the playback of content at the device 207. That is to say, the determination of a need for a new key, and retrieval thereof, if occurring during the playback of content will occur quickly enough so as to not interfere with the playback of the content; network or server processing latency presents no significant delay, thereby not affecting user experience.

In an alternative embodiment, the key rotation may occur on a per-program basis. That is, a new key may be generated for each new program or content element. In this manner, there will be no need for a key exchange during playback of a particular content element. At the request for or onset of playback of each new program, a new key will be provided, thereby assuring keys stay "fresh".

In yet another variant, a "use it or lose it" type model is implemented, wherein the generation of the key starts a timer such that if the requesting user device 207 does not request or access the key (e.g., via a provided URL) within a prescribed period (e.g., 5 seconds), the key is not provided to that user except under a new request/key generation procedure. In this fashion, the opportunity for surreptitious access to the key (and hence the protected content elements) is further minimized.

An integrated database management system (IDMS) having a service-oriented architecture (SOA) and a MAC-to-IP (MAC2IP) address database 214 is also utilized in the exemplary authorization process. For example, as will be discussed below, one exemplary authorization check involves ensuring that the requesting device 207 is "behind" a registered cable modem or gateway 224. Accordingly, the requesting client device 207 in one variant provides to the network a MAC address of the cable modem/gateway 224 with which it is associated. For instance, the MAC addresses of all authorized cable modems are known to the access network 222 by, e.g., maintaining a list thereof at the IDMS 214. The MAC address is cross-referenced in the MAC2IP database to determine whether it corresponds to an IP address assigned by the MSO network. In other words, the MAC2IP database contains a listing of information regarding all of the cable modems 224 registered to receive content via the MSO-operated content distribution network. The list is consulted when a request for content is received, and if it can be determined that the requesting device 207 is associated to an authorized cable modem/gateway, the content is provided thereto.

Figure 4A:
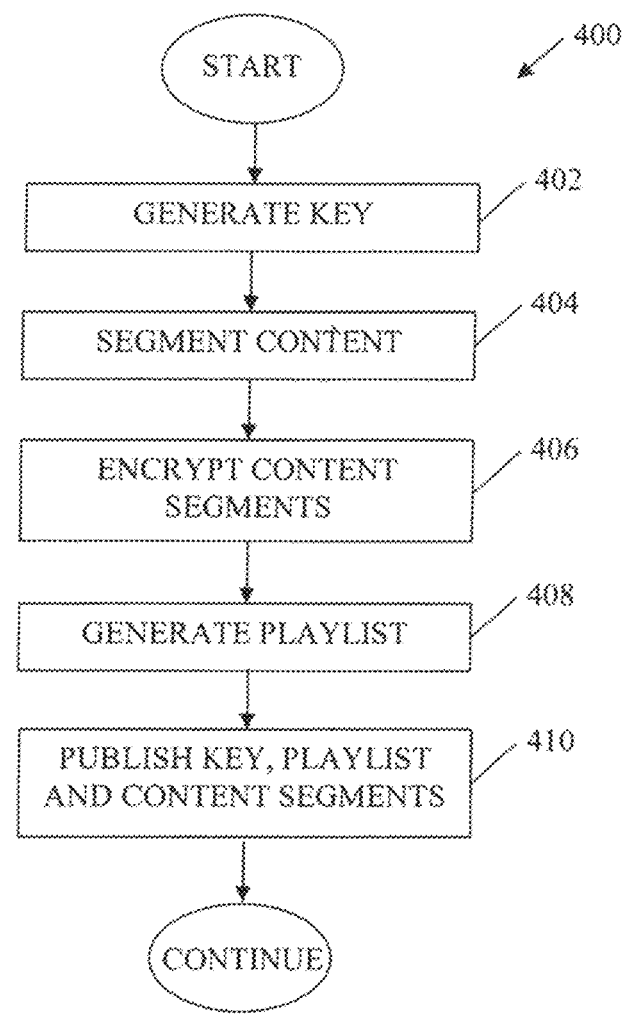
FIGS. 4a-4b are logical flow diagrams illustrating exemplary methods for providing content to an IP-enabled device via a content distribution network according to the present invention.

Referring now to FIG. 4a, an exemplary embodiment of a method 400 for encrypting content and preparing it for delivery to a plurality of IP-enabled client devices 207 is illustrated.

Per step 402, the content encryption/decryption key is generated. As noted above, in an exemplary embodiment of the present invention, the same key is used for encrypting and decrypting the content (symmetric-key encryption). Key generation according to the present invention occurs substantially at the one or more encoder entities 210, although other entities may perform this operation if desired.

Next, at step 404, the content is segmented into a plurality of content segments. The content segments may comprise for example .ts files (as noted above). The segmented content is then encrypted using the encryption/decryption key, and provided to a storage entity (such as e.g., the root server 202) for storage per step 406.

A playlist is generated identifying the individual segments which comprise a particular content element (step 408), and a URL needed to access each is also identified. At step 410, the content encryption/decryption key, the playlist, and the individual content segments are published to the root server 202. These items may be part of a unitary "package", or published/provided as separate components via separate channels/mechanisms.

Figure 4B:
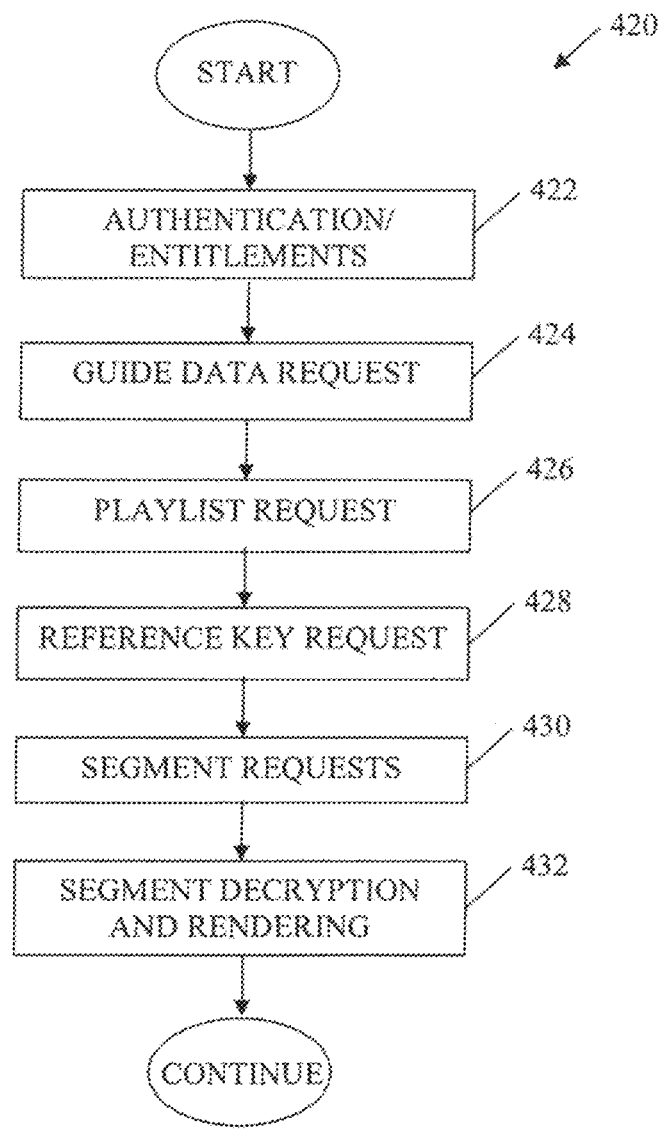

FIG. 4b illustrates an exemplary method 420 for requesting and decrypting content received from the content distribution network at an IP-enabled client device 207. Per step 422, the requesting device 207 is first authenticated and its entitlement to receive content are checked. This occurs in one implementation according to the methods discussed below with respect to FIGS. 5, 5a, and 6, although other approaches may be used as well.

The authenticated/entitled client device 207 accesses the access network 222 (such as via entry of a web address) and is able to request and receive guide data therefrom (step 424). The user uses the guide data to select particular content for viewing, and hence the request causes generation of a playlist from the CDN edge cache 220 for viewing (step 426).

Per step 428, the client 207 requests the content encryption/decryption key from the key server (origin server) 202.

As noted previously, the requests discussed herein as originating at the client device 207 may be served directly to the entity from which the content, key, playlist, etc. is requested, or alternatively may be routed through the cable modem/gateway 224. The requests may be packaged or bundled as previously noted (i.e., comprise one unified request), or be separate requests.

Using the obtained playlist URLs, the device 207 can request the individual segments of the particular content requested, per step 430. Then, per step 432, the device is able to use the obtained decryption key to decrypt the content segments as they are identified in the playlist in order to form a complete playout of the requested content.

Authentication/Entitlements Apparatus and Methods

Figure 5:
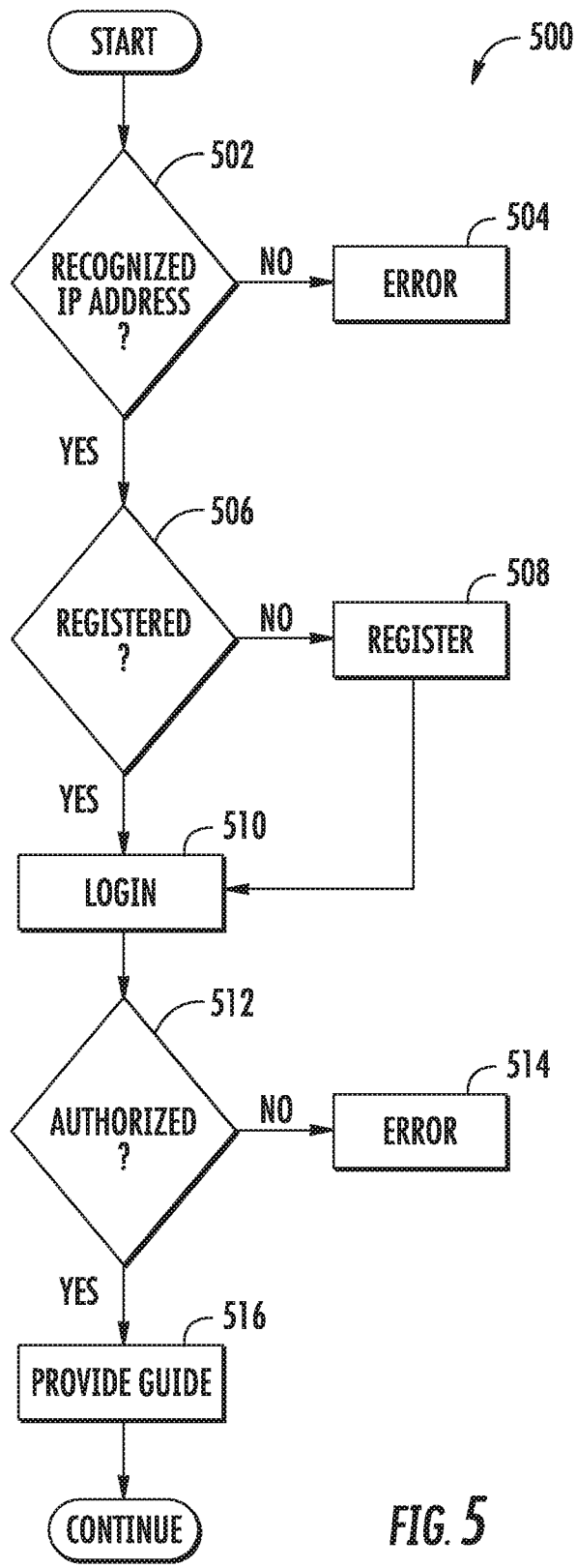
FIG. 5 is a logical flow diagram illustrating an exemplary method for authenticating and/or authorizing a particular IP-enabled client device to receive content in a content distribution network.

Referring now to FIG. 5, an exemplary embodiment of a method 500 for authenticating and/or authorizing a particular IP-enabled client device 207 to receive content in a content distribution network is illustrated. Via this method, it can be ensured that entitlements criteria specified by the MSO (and/or content source) are met by the requesting IP-enabled device 207.

Although illustrated in FIG. 5 as a series or sequence of checks, it is appreciated by those of ordinary skill that one or more of the authorization/entitlements checks may be omitted, performed in parallel, and/or the order of performance permuted. This includes for instance selectively applying various of the checks/steps based on one or more criteria, such as e.g., the "newness" of the content requested (for example, older content may be deemed to be less valuable, and hence fewer checks or safeguards are applied), the service level of the requesting user/device 207, the type or location of the device (e.g., mobile wireless devices not at the user's prescribed or registered subscription address may be deemed more or less risky, and hence require more or fewer checks, respectively), and so forth.

Per step 502, it is determined whether the requesting device 207 is associated to a cable modem or gateway device having a recognized IP address. The determination of step 502 is based in the exemplary implementation on the MAC address provided to the access network 222 from the requesting IP-enabled device 207 being correlated to a known IP address at the MAC2IP database 214 (discussed above).

In one embodiment, the system is only able to recognize IP addresses assigned to cable modems or gateways of individual subscribers (e.g., cable modems disposed at a registered user premises). In another embodiment, the system is able to recognize requests associated to cable modems or interface devices located outside of a particular individual subscriber's premises (i.e., public Wi-Fi hot spot modems or APs).

In one variant, the aforementioned entitlements check (i.e., ensuring that the requesting device is behind a recognized cable modem or WiFi hotspot) is performed according to the methods and apparatus discussed in co-owned U.S. patent application Ser. No. 12/536,724 filed on Aug. 6, 2009, entitled "SYSTEM AND METHOD FOR MANAGING ENTITLEMENTS TO DATA OVER A NETWORK", and issued as U.S. Pat. No. 8,341,242 on Dec. 25, 2012, which is incorporated herein by reference in its entirety. As discussed therein, entitlement to content residing on a server is determined by e.g., the computing device operated by a subscriber generating a request for access to a requested content residing on a content access provider server. The subscriber has an account with a multi-channel video program distributor (MVPD), and the account comprises subscription information indicative of the services provided by the MVPD to the subscriber. The content request is received by the content access provider and forwarded to an entitlements server. The entitlements server determines whether the subscriber is entitled to receive the requested content based on the subscription information, and sends an access granted message to the content access provider server when the subscriber is entitled to receive the requested content.

In another embodiment, entitlements are determined via a geographic location of an MSO-managed public hotspot. According to this embodiment, the previously discussed MAC2IP database is utilized to determine the MAC address of the hotspot given its IP address. Alternatively, or in addition, authentication of the user or subscriber may be performed to ensure services are provided appropriately (such as according to a geographic location to which the subscriber is associated).

If the MAC or IP address is not recognized by the content distribution network, then per step 504, an error message is provided to the requesting device. Alternatively, if the address is identified, the method 500 proceeds to a second authentication check (step 506).

At step 506, it is determined whether the requesting device and/or user is registered to the content distribution network. In one variant, the registration process occurs at the first instance a subscriber attempts to access content via the hereindescribed system. Alternatively, the subscriber may utilize a separate channel for registration, such as e.g., a website, call-in, etc.

In the instance the requesting subscriber is not yet registered, per step 508 a registration process is entered. Registration in this embodiment requires creation of a login identity (such as a username) and password combination. Additionally, the login identity and password are linked to an existing subscriber account. It is appreciated, however, that other registration processes may be employed, the foregoing being merely illustrative of the overall concept of linking the particular subscriber account to the user/device requesting access.

If the subscriber has previously registered, per step 510, the user may login to the content distribution network services.

Next, per step 512, the particular subscriber's authorization to receive requested content is evaluated. If the subscriber selects content which he is not authorized to receive, an error message will display (step 514). Alternatively, if the selected content is within the subscriber's level or tier, the content is provided (step 516).

In an alternative embodiment, rather than providing an ability of the subscriber to select any content (including content which the subscriber does not have authorization to access), the system may use information gained at the subscriber's login to filter the guide data presented to the subscriber. In this manner, only content which the subscriber is authorized to view will be listed in the guide and therefore be available for user selection. This embodiment reduces the number of authorization checks the system will be required to perform as it will be known that if the subscriber was able to select a particular content element from the guide, than he/she is authorized to receive that content.

Figure 5A:
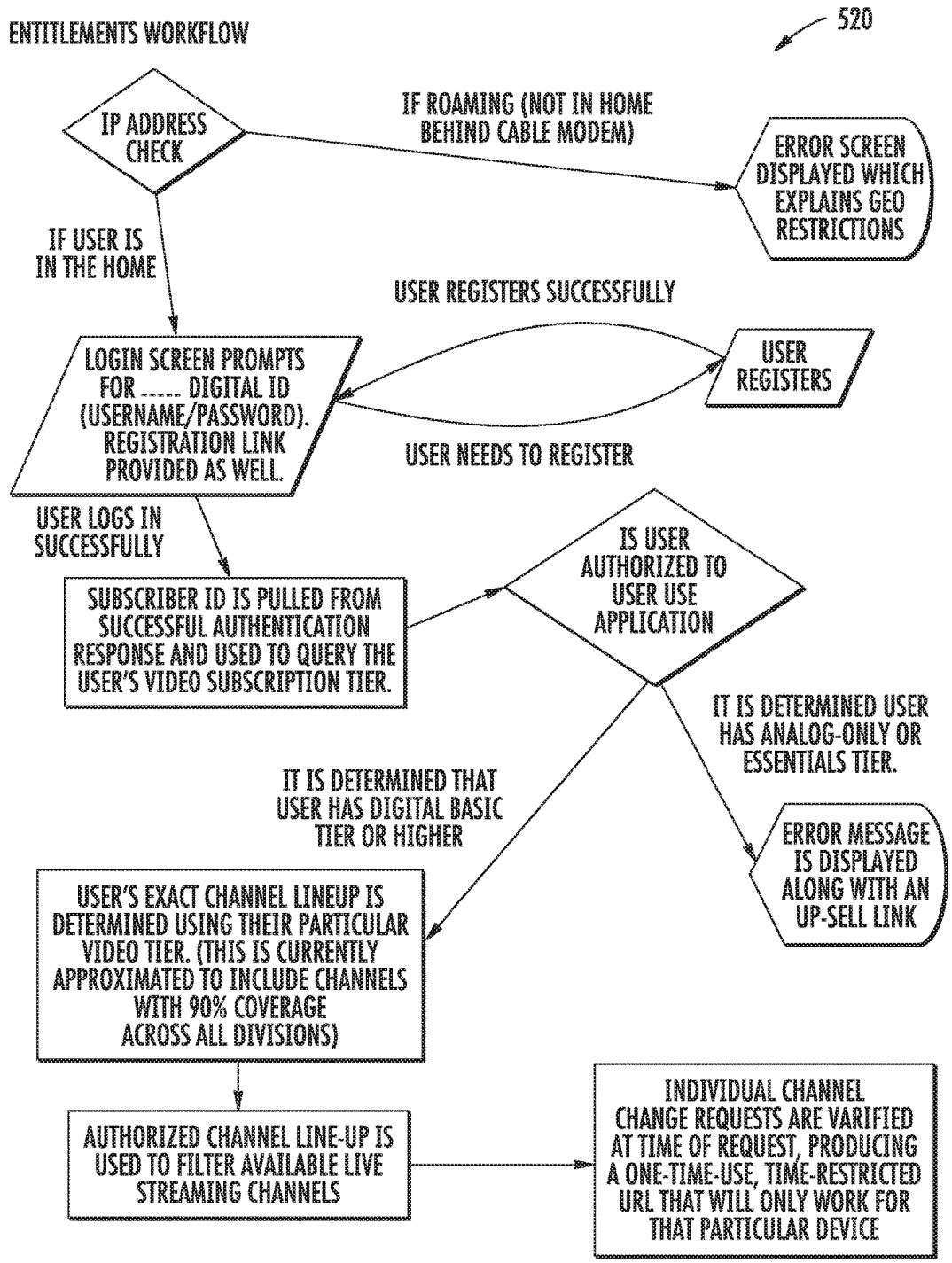
FIG. 5a is a functional block diagram illustrating an exemplary workflow for ensuring entitlements criteria are met by an IP-enabled device receiving content via a content distribution network.

FIG. 5*a* illustrates one exemplary implementation of the method of previously discussed FIG. 5. As shown, according to this method of FIG. 5*a*, it is first determined whether the requesting device is behind a premises (e.g., in-home) cable modem registered to and recognized by the MSO network. If the requesting device is not within range of the home cable modem Wi-Fi, an error message describing the geolocation restrictions of the system is presented to the user. In other words, it is explained that the network cannot provide content to the device when it is not within the home network.

If the requesting device is within the premises (and therefore behind a recognized cable modem), a login screen is presented. The login screen prompts the user for his digital identity (username and password) and may also include a registration link. The registration link may be used in the instance the subscriber has not previously registered for the requested service. Using the link, the subscriber registers his account, and is returned to the login screen.

Once the subscriber successfully logs in, the subscriber identity is pulled from the successful authentication response, and is used to query the subscriber's video subscription tier. In order for a user to be allowed to access the IP content delivery application, he/she must at least be subscribed to a digital content access subscriber tier. In the illustrated example, subscribers to an analog-only service are not permitted access to the IP content delivery discussed herein and are instead presented with an error message and an opportunity to change their level of service (a so-called "upsell").

According to the method of FIG. 5a, once the subscriber is determined to be authorized to receive service, the subscriber's particular video tier is used to determine a channel lineup for display of the available live streaming channels. In the illustrated embodiment, individual channel change requests are verified at the time of the request, thereby producing a one-time use, time-restricted URL that will only work for the requesting device.

Figure 6:
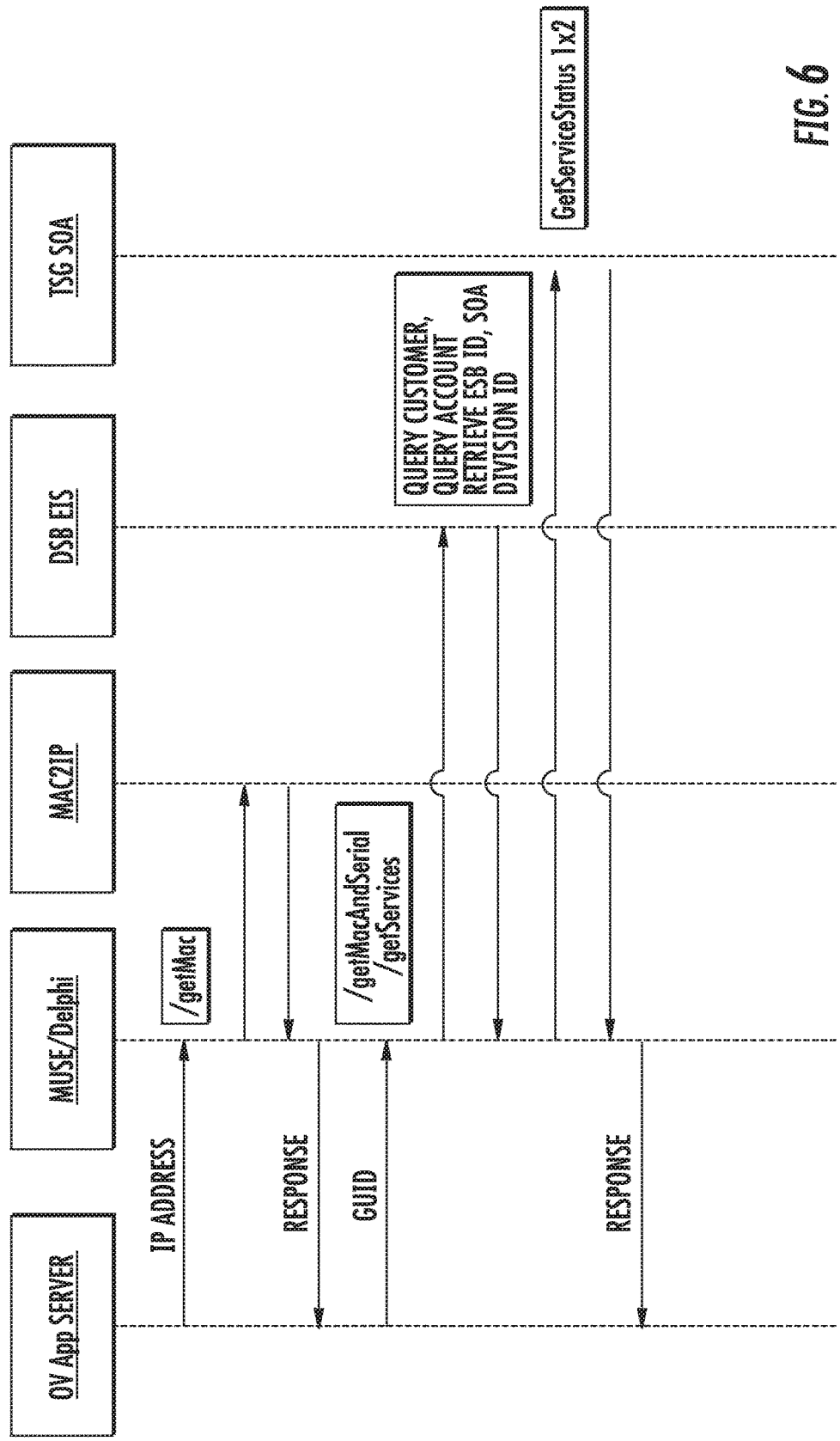
FIG. 6 is a functional block diagram illustrating exemplary calls for ensuring entitlements criteria are met by an IP-enabled device receiving content via a content distribution network.

Referring now to FIG. 6, exemplary calls needed to perform the authentication/entitlement checks of FIGS. 5 and 5a are illustrated. Generally speaking, the application communicates to the MAC2IP database via a software application (such as e.g., MUSE/Delphi software owned by the Assignee hereof) in order to perform the IP address confirmation step discussed previously. However, it is appreciated that the system may utilize any number of other software and configurations for providing communication between these entities, the MUSE/Delphi software being merely illustrative. The MUSE/Delphi software is specifically configured to ensure that customer service data (including GUID) is not exposed, such as by using an encrypted cookie decryptable only by the MUSE software. The application provides an IP address which is checked by the database to ensure that the request is coming from an authorized cable modem or Wi-Fi hotspot. Additionally, the exemplary MUSE/Delphi software is used to pull information regarding a subscriber's account and identification from an enterprise information store (which contains customer and account information) such as e.g., the DSB EIS and/or other operator network entity (including e.g., the technology service group (TSG)) having a service-orientated architecture (SOA).

While illustrated in FIG. 6 as each occurring, it is appreciated that one or more authentication/authorization steps may be omitted or replaced. The service calls of FIG. 6 are merely exemplary of communication between the system entities.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for providing content to an Internet Protocol (IP)-enabled user device via a managed content distribution network, the user device associated with a subscriber of the network, the method comprising:
    receiving a request for a content element, the request received from the user device via a wireless-enabled settop box, the content element comprising at least video;
    authenticating the wireless-enabled settop box as having a valid video services subscription only;
    processing the content element into a plurality of segments, each of the plurality of segments being associated to a particular uniform resource locator (URL);
    cryptographically protecting at least a portion of the plurality of segments;
    generating a playlist configured to, when selected for playback by the subscriber, form a complete playout of the requested content element, the playlist comprising data representative of a list of the particular URL for each of the plurality of segments of the complete playout and a URL associated with a cryptographic element, the cryptographic element being configured to decrypt content which has been cryptographically protected; and
    providing the data representative of the playlist and the plurality of protected segments to the user device via the managed content distribution network and the wireless-enabled settop box of the subscriber in data communication with the managed content distribution network, the providing via the managed content distribution network and the wireless-enabled settop box comprising delivery, via infrastructure of the managed content distribution network utilized for at least delivery of Moving Picture Experts Group (MPEG) video services, and over in-band quadrature amplitude modulation (QAM) channels using an MPEG-2 transport stream and encapsulation protocol.

2. The method of claim 1, wherein the managed network is selected from a group consisting of: (i) a cable television network; (ii) a satellite network; and (iii) a hybrid fiber copper (HFCu) network.

3. The method of claim 1, wherein the cryptographic element comprises a decryption key configured to decrypt content which has been encrypted.

4. The method of claim 1, wherein the cryptographically protecting comprises encrypting the plurality of segments utilizing a symmetric encryption key approach.

5. The method of claim 1, wherein the plurality of segments comprises a plurality of Moving Pictures Experts Group (MPEG) transport stream (.ts) files.

6. The method of claim 1, wherein at least the plurality of protected segments and the data representative of the playlist are provided as part of a common data structure to the user device.

7. The method of claim 1, wherein the request is received indirectly from the user device via the premises device, the request being rendered at least in part in an Hypertext Transfer Protocol (HTTP)-based protocol such that no translation thereof by the content distribution network is required.

8. The method of claim 1, wherein the cryptographic element comprises a predetermined use period after which the cryptographic element is no longer valid.

9. The method of claim 1, wherein the cryptographically protecting at least a portion of the plurality of segments comprises using a first key to encrypt the segments during a first period, and a second key to encrypt the segments during a second, subsequent period.

10. Network apparatus configured to enable provision of Internet Protocol (IP) content to an IP-enabled user device via a managed content distribution network via extant video delivery infrastructure, the IP-enabled user device associated with a subscriber of the managed content distribution network, the subscriber registered therein, the network apparatus comprising:
processing apparatus;
data interface apparatus in data communication with the processing apparatus and configured to receive requests from IP-enabled user devices via the managed network;
a subscriber database in data communication with the processing apparatus, the database comprising data authenticating the subscriber as being entitled to access the requested content element; and
computerized logic in data communication with the processing apparatus and configured to:
based at least on a received request from the IP-enabled user device for a content element, cause access of the database to authenticate the subscriber, the request comprising authentication data provided by the subscriber;
after the authentication, cause processing of the content element into a plurality of segments, each of the plurality of segments being associated to a particular uniform resource locator (URL);
cause cryptographic protection of at least a portion of the plurality of segments;
cause generation of data representative of a playlist configured to, when selected for playback by the subscriber, form a complete playout of the requested content element, the data representative of the playlist comprising a list of the particular URL for each of the plurality of segments of the complete playout and a URL associated with a cryptographic element, the cryptographic element being configured to decrypt content which has been cryptographically protected; and
cause provision, via infrastructure of the managed network, of the data representative of the playlist and the plurality of protected segments to the IP-enabled user device via an MPEG-based transport stream and a settop box in data communication with the IP-enabled user device;
wherein:
the managed network utilized for delivery of at least Moving Picture Experts Group (MPEG) video services;
the provision comprises delivery of the data representative of the playlist and the plurality of protected segments over in-band quadrature amplitude modulation (QAM) channels using an MPEG-2 transport stream and encapsulation protocol; and
the authentication comprises authentication of the settop box as having a valid video services subscription only.

11. The apparatus of claim 10, wherein the provision of the data representative of the playlist and the plurality of protected segments to the user device occurs without the use of high-speed data services.

12. The apparatus of claim 10, wherein the authentication comprises use of a geographic location associated with the subscriber.

13. The apparatus of claim 10, wherein the computerized logic is further configured to cause dynamic caching of one or more versions of the content element at an edge of the managed network based at least in part on a duplicate request for the one or more versions of the content element.

14. Computer readable apparatus comprising a non-transitory storage medium, the non-transitory medium comprising at least one computer program having a plurality of instructions, the instructions configured to, when executed on a processing apparatus:
receive data representative of a request for a digitally rendered content element, the data representative of the request received from a computerized user device via a settop box (STB);
authenticate the STB as having a valid video services subscription only;
cause processing of the digitally rendered content element into a plurality of segments, each of the plurality of segments being associated to a particular uniform resource locator (URL);
cause cryptographic protection of at least a portion of the plurality of segments;
cause generation of a playlist configured to, when selected for playback by the subscriber, form a complete playout of the requested content element, the playlist comprising a list of the particular URL for each of the plurality of segments of the complete playout and a URL associated to a cryptographic element, the cryptographic element being configured to decrypt content which has been cryptographically protected; and
cause provision of the playlist and the plurality of protected segments to the computerized user device via: (i) the STB, and (ii) infrastructure of a managed content distribution network also utilized for delivery of MPEG video services, the provision comprising delivery over in-band quadrature amplitude modulation (QAM) channels using an MPEG-2 transport stream and encapsulation protocol.

15. The computer readable apparatus of claim 14, wherein the data representative of the request is received from the user device via an unmanaged wireless access point, the data representative of the request being rendered at least in part in an Hypertext Transfer Protocol (HTTP)-based protocol such that no translation thereof by the managed content distribution network or an unmanaged network of the unmanaged wireless access point is required.

16. The computer readable apparatus of claim 15, wherein the unmanaged network comprises a network of a service provider, the service provider being federated with the managed content distribution network such that subscribers of the managed content distribution network can be authenticated by the service provider outside of the managed content distribution network in response to the request.

17. The computer readable apparatus of claim 14, wherein the instructions are further configured to, when executed on a processing apparatus: cause dynamic caching of one or more versions of the digitally rendered content element at an edge of the managed content distribution network based at least in part on a duplicate request for the one or more versions of the digitally rendered content element.

\* \* \* \* \*